US007873523B2

(12) United States Patent
Potter et al.

(10) Patent No.: US 7,873,523 B2
(45) Date of Patent: Jan. 18, 2011

(54) COMPUTER IMPLEMENTED METHOD OF ANALYZING RECOGNITION RESULTS BETWEEN A USER AND AN INTERACTIVE APPLICATION UTILIZING INFERRED VALUES INSTEAD OF TRANSCRIBED SPEECH

(75) Inventors: Stephen F. Potter, Seattle, WA (US); Anthony W. Bowker, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1132 days.

(21) Appl. No.: 11/170,945

(22) Filed: Jun. 30, 2005

(65) Prior Publication Data

US 2007/0005354 A1 Jan. 4, 2007

(51) Int. Cl.
*G10L 21/00* (2006.01)

(52) U.S. Cl. .................................. 704/275

(58) Field of Classification Search .............. 704/270.1, 704/275
See application file for complete search history.

(56) References Cited

U.S. PATENT DOCUMENTS

| | | | | |
|---|---|---|---|---|
| 5,588,044 A * | 12/1996 | Lofgren et al. | ............. | 379/67.1 |
| 5,678,002 A | 10/1997 | Fawcett et al. | | |
| 5,787,414 A * | 7/1998 | Miike et al. | ..................... | 707/2 |
| 5,960,394 A * | 9/1999 | Gould et al. | ............. | 704/270.1 |
| 5,983,179 A * | 11/1999 | Gould | ..................... | 704/270.1 |
| 5,999,904 A * | 12/1999 | Brown et al. | ................ | 704/272 |
| 6,014,647 A | 1/2000 | Nizzari et al. | | |
| 6,405,170 B1 * | 6/2002 | Phillips et al. | .............. | 704/270 |
| 6,510,411 B1 * | 1/2003 | Norton et al. | ............... | 704/254 |
| 6,526,382 B1 * | 2/2003 | Yuschik | ....................... | 704/275 |
| 6,606,598 B1 | 8/2003 | Holthouse et al. | | |
| 6,823,054 B1 | 11/2004 | Suhm et al. | | |
| 6,829,603 B1 * | 12/2004 | Chai et al. | ..................... | 707/5 |
| 6,839,669 B1 * | 1/2005 | Gould et al. | ................ | 704/246 |
| 6,904,143 B1 | 6/2005 | Peterson et al. | | |
| 7,003,079 B1 | 2/2006 | McCarthy et al. | | |
| 7,020,841 B2 | 3/2006 | Dantzig | | |
| 7,043,435 B2 | 5/2006 | Knott et al. | | |
| 7,085,716 B1 | 8/2006 | Even | | |
| 7,216,079 B1 | 5/2007 | Barnard et al. | | |
| 7,302,390 B2 * | 11/2007 | Yang et al. | .................. | 704/246 |

(Continued)

FOREIGN PATENT DOCUMENTS

EP 1286330 A2 2/2003

OTHER PUBLICATIONS

Official Search Report of the US Patent Office in counterpart foreign application No. PCT/US06/22141 filed Jun. 7, 2006.
Written Opinion from the US Patent Office in counterpart foreign application No. PCT/US06/22141 filed Jun. 7, 2006.

(Continued)

*Primary Examiner*—Michael N Opsasnick

(57) ABSTRACT

A computer implemented method of analyzing recognition results between a user in an interactive application having dialogue turns includes receiving and storing information on a computer indicative of dialogue turns between the system and at least one user. The method also utilizes a computer recognition analysis module comprising an inference module operable on a computer to associate an inferred value of a response with a turn where the inferred value is based on analyzing the received information without performing transcription of the user response within the inference module. The method also includes outputting the inferred value.

20 Claims, 16 Drawing Sheets

U.S. PATENT DOCUMENTS

| | | |
|---|---|---|
| 2003/0144843 A1 | 7/2003 | Belrose |
| 2004/0162724 A1 | 8/2004 | Hill et al. |
| 2005/0080630 A1 | 4/2005 | Mills et al. |
| 2007/0005369 A1 | 1/2007 | Potter |
| 2007/0006082 A1 | 1/2007 | Potter |

OTHER PUBLICATIONS

User's Guide, SpeechWorks for OpenSpeech Insight™ Analysis and Reporting Tool 1.0, Mar. 2002, pp. 1-324.

European Patent Office Search Report for EPO Patent Application No. 06772442.7, mailed on Sep. 10, 2009, 5 pages.

* cited by examiner

COMPUTER IMPLEMENTED METHOD OF ANALYZING RECOGNITION RESULTS BETWEEN A USER AND AN INTERACTIVE APPLICATION UTILIZING INFERRED VALUES INSTEAD OF TRANSCRIBED SPEECH

BACKGROUND

The discussion below is merely provided for general background information and is not intended to be used as an aid in determining the scope of the claimed subject matter.

Small computing devices such as personal digital assistants (PDA), devices and portable phones are used with ever increasing frequency by people in their day-to-day activities. With the increase in processing power now available for microprocessors used to run these devices, the functionality of these devices is increasing, and in some cases, merging. For instance, many portable phones now can be used to access and browse the Internet as well as can be used to store personal information such as addresses, phone numbers and the like.

In view that these computing devices are being used with increasing frequency, it is therefore necessary to provide an easy interface for the user to enter information into the computing device. Unfortunately, due to the desire to keep these devices as small as possible in order that they are easily carried, conventional keyboards having all the letters of the alphabet as isolated buttons are usually not possible due to the limited surface area available on the housings of the computing devices. Even beyond the example of small computing devices, there is interest in providing a more convenient interface for all types of computing devices.

To address this problem, there has been increased interest and adoption of using voice or speech to access information, whether locally on the computing device, over a local network, or over a wide area network such as the Internet. With speech recognition, a dialog interaction is generally conducted between the user and the computing device. The user receives information typically audibly and/or visually, while responding audibly to prompts or issuing commands.

Generally, a speech recognition system uses various modules, such as an acoustic model and a language model as is well known in the art, to process the input utterance. Either general purpose models, or application specific models can be used, if, for instance, the application is well-defined. In many cases though, tuning of the speech recognition system, and more particularly, adjustment of the models is necessary to ensure that the speech recognition system functions effectively for the user group that it is intended. Once the system is deployed, it may be very helpful to capture, transcribe and analyze real spoken utterances in order that the speech recognition system can be tuned for optimal performance. For instance, language model tuning can increase the coverage of the system, while removing unnecessary words so as to improve system response and accuracy. Likewise, acoustic model tuning focuses on conducting experiments to determine improvement in search, confidence and acoustic parameters to increase accuracy and/or speed of the speech recognition system.

As indicated above, transcription of recorded speech data collected from the field provides a means for evaluating system performance and to train data modules. Literally, current practices require a data transcriber/operator to listen to utterances and then type or otherwise associate a transcription of the utterance for each utterance. For instance, in a call transfer system, the utterances can be names of individuals or departments the caller is trying to reach. The transcriber would listen to each utterance and transcribe each request, possibly by accessing a list of known names. Transcription is time consuming and thus, an expensive process. In addition, transcription is also error-prone, particularly for utterances comprising less common words or phrases.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

A recognition analysis module receives input logged application data and performs analysis thereof. In general, recognition analysis module reveals recognition problems in an application, for instance, one or more recognition problems that a number of users are encountering. Recognition analysis includes receiving the semantic information in the logged application data and determining if a good recognition was made for a given received response without performing transcription of the received response. Although determination is made at a semantic level, useful analysis data can be obtained for tuning the application.

DETAILED DESCRIPTION

Figure 1:
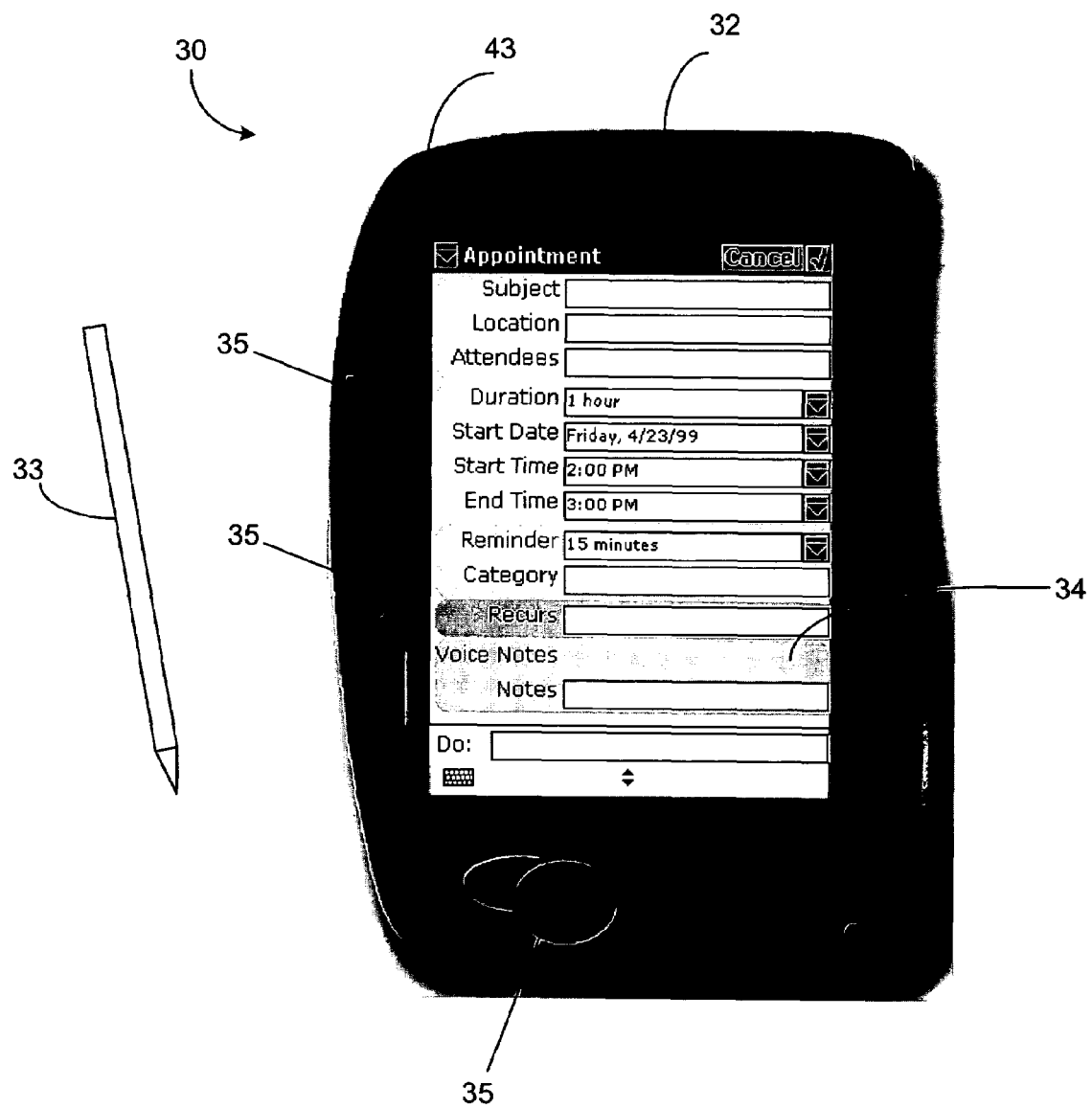
FIG. 1 is a plan view of a first embodiment of a computing device operating environment.

Before describing aspects of diagnosing speech recognition problems in a speech enabled application, it may be useful to describe generally computing devices that can be used in a speech application. Referring now to FIG. 1, an exemplary form of a data management device (PIM, PDA or the like) is illustrated at 30. However, it is contemplated that the concepts described herein can also be practiced using other computing devices discussed below, and in particular, those computing devices having limited surface areas for input buttons or the like. For example, phones and/or data management devices will also benefit from the concepts described herein. Such devices will have an enhanced utility compared to existing portable personal information management devices and other portable electronic devices, and the functions and compact size of such devices will more likely encourage the user to carry the device at all times. Accordingly, it is not intended that the scope of application herein described be limited by the disclosure of an exemplary data management or PIM device, phone or computer herein illustrated.

An exemplary form of a data management mobile device 30 is illustrated in FIG. 1. The mobile device 30 includes a housing 32 and has a user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the invention is not intended to be limited by these forms of input mechanisms. For instance, another form of input can include a visual input such as through computer vision.

Figure 2:
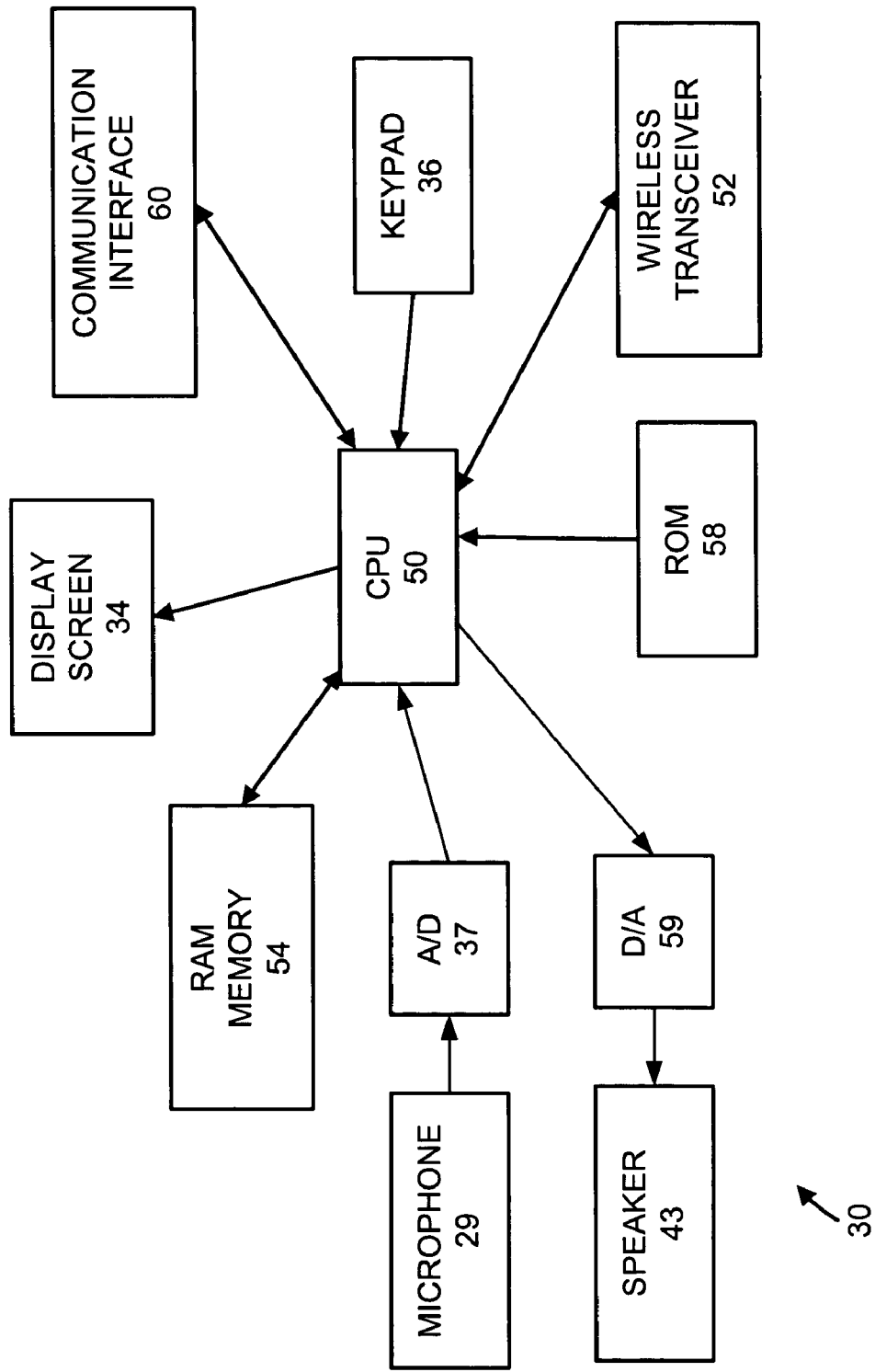
FIG. 2 is a block diagram of the computing device of FIG. 1.

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54).

RAM 54 also serves as a storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results. Using wireless transceiver 52 or communication interface 60, speech data may be transmitted to a remote recognition server 204 discussed below and illustrated in the architecture of FIG. 4. Recognition results may then be returned to mobile device 30 for rendering (e.g. visual and/or audible) thereon, and eventual transmission to a web server 202 (FIG. 4), wherein the web server 202 and mobile device 30 operate in a client/server relationship. Similar processing can be used for other forms of input. For example, handwriting input can be digitized with or without pre-processing on device 30. Like the speech data, this form of input may be transmitted to the recognition server 204 for recognition wherein the recognition results are then returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input.

In addition to the portable or mobile computing devices described above, it should also be understood that the concepts described herein can be used with numerous other computing devices such as a general desktop computer. For instance, a user with limited physical abilities can input or enter text into a computer or other computing device when other conventional input devices, such as a full alpha-numeric keyboard, are too difficult to operate.

The invention is also operational with numerous other general purpose or special purpose computing systems, environments or configurations. Examples of well known computing systems, environments, and/or configurations that may be suitable for use with the invention include, but are not limited to, wireless or cellular telephones, regular telephones (without any screen), personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Figure 3:
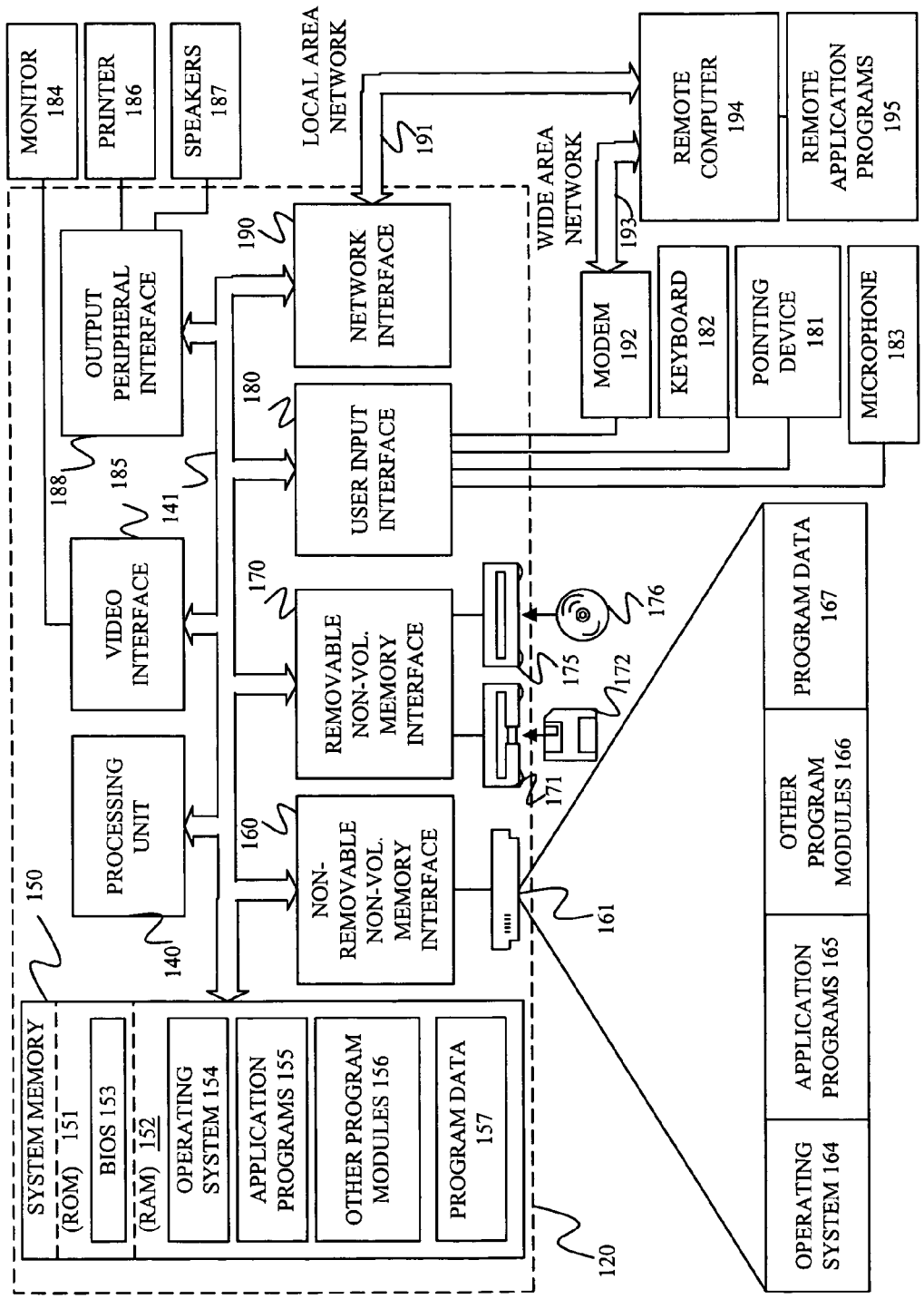
FIG. 3 is a block diagram of a general purpose computer.

The following is a brief description of a general purpose computer 120 illustrated in FIG. 3. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The description below may be provided in the general context of computer-executable instructions, such as program modules, being executed by a computer. Generally, program modules include routines, programs, objects, components, data structures, etc. that perform particular tasks or implement particular abstract data types. The exemplary embodiments herein described may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 3, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 3 illustrates operating system 54, application programs 155, other program modules 156, and program data 157.

The computer 120 may also include other removable/non-removable volatile/nonvolatile computer storage media. By way of example only, FIG. 3 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 3, provide storage of computer readable instructions, data structures, program modules and other data for the computer 120. In FIG. 3, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 3 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 3 illustrates remote application programs 195 as residing on remote computer 194. It will be appreciated that the network connections shown are exemplary and other means of establishing a communications link between the computers may be used.

Exemplary Embodiments

Figure 4:
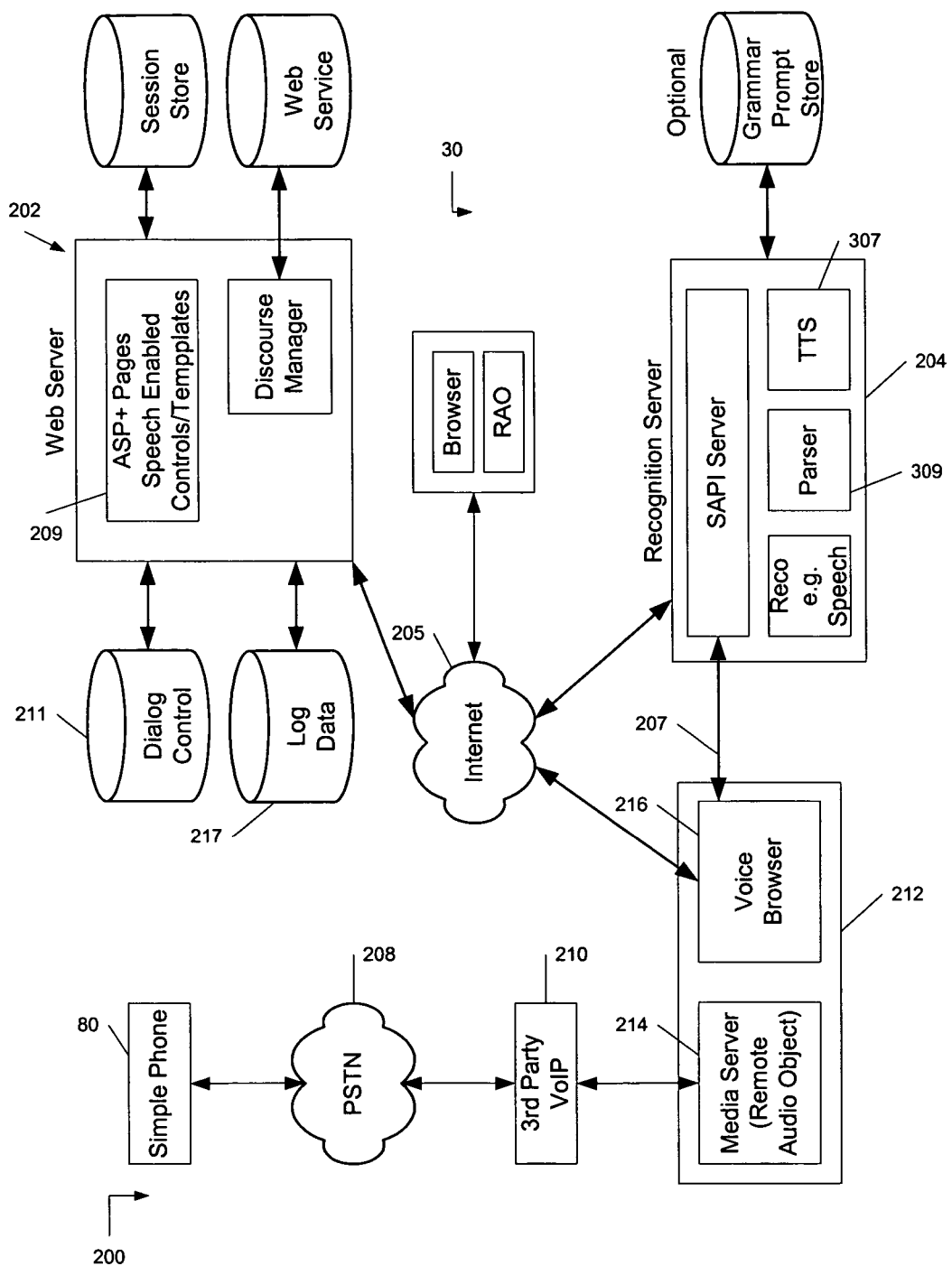
FIG. 4 is a block diagram of an architecture for a client/server system.

FIG. 4 illustrates architecture 200 for network based recognition (herein exemplified with a wide area network) as can be used with the concepts described herein. However, it should be understood, that interaction with remote components is but one embodiment in that a speech application including the recognizer may be operable on a single computing device with all necessary components or modules present therein.

Generally, information stored in a web server 202 can be accessed through mobile device 30 (which herein also represents other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

In this exemplary embodiment, architecture 200 is unified in that whether information is obtained through device 30 or phone 80 using speech recognition, a single recognition server 204 can support either mode of operation. In addition, architecture 200 operates using an extension of well-known markup languages (e.g. HTML, XHTML, cHTML, XML, WML, and the like). Thus, information stored on web server 202 can also be accessed using well-known GUI methods found in these markup languages. By using an extension of well-known markup languages, authoring on the web server 202 is easier, and legacy applications currently existing can be also easily modified to include voice or other forms of recognition.

Generally, device 30 executes HTML+ scripts, or the like, provided by web server 202. When voice recognition is required, by way of example, speech data, which can be digitized audio signals or speech features wherein the audio signals have been preprocessed by device 30 as discussed above, are provided to recognition server 204 with an indication of a grammar or language model to use during speech recognition. The implementation of the recognition server 204 can take many forms, one of which is illustrated, but generally includes a recognizer 211. The results of recognition are provided back to device 30 for local rendering if desired or appropriate. Upon compilation of information through recognition and any graphical user interface if used, device 30 sends the information to web server 202 for further processing and receipt of further HTML scripts, if necessary.

As illustrated in FIG. 4, device 30, web server 202 and recognition server 204 are commonly connected, and separately addressable, through a network 205, herein a wide area network such as the Internet. It therefore is not necessary that any of these devices be physically located adjacent to each other. In particular, it is not necessary that web server 202 includes recognition server 204. In this manner, authoring at web server 202 can be focused on the application to which it is intended without the authors needing to know the intricacies of recognition server 204. Rather, recognition server 204 can be independently designed and connected to the network 205, and thereby, be updated and improved without further changes required at web server 202. As discussed below, web server 202 can also include an authoring mechanism that can dynamically generate client-side markups and scripts. In a further embodiment, the web server 202, recognition server 204 and client 30 may be combined depending on the capabilities of the implementing machines. For instance, if the client comprises a general purpose computer, e.g. a personal computer, the client may include the recognition server 204. Likewise, if desired, the web server 202 and recognition server 204 can be incorporated into a single machine.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephone voice browser 212 includes a media server 214 that provides a telephony interface and a voice browser 216. Like device 30, telephony voice browser 212 receives HTML scripts or the like from web server 202. In one embodiment, the HTML scripts are of the form similar to HTML scripts provided to device 30. In this manner, web server 202 need not support device 30 and phone 80 separately, or even support standard GUI clients separately. Rather, a common markup language can be used. In addition, like device 30, voice recognition from audible signals transmitted by phone 80 are provided from voice browser 216 to recognition server 204, either through the network 205, or through a dedicated line 207, for example, using TCP/IP. Web server 202, recognition server 204 and telephone voice browser 212 can be embodied in any suitable computing environment such as the general purpose desktop computer illustrated in FIG. 3.

However, it should be noted that if DTMF recognition is employed, this form of recognition would generally be performed at the media server 214, rather than at the recognition server 204. In other words, the DTMF grammar would be used by the media server 214.

Referring back to FIG. 4, web server 202 can include a server side plug-in authoring tool or module 209 (e.g. ASP, ASP+, ASP.Net by Microsoft Corporation, JSP, Javabeans, or the like). Server side plug-in module 209 can dynamically generate client-side markups and even a specific form of markup for the type of client accessing the web server 202. The client information can be provided to the web server 202 upon initial establishment of the client/server relationship, or the web server 202 can include modules or routines to detect the capabilities of the client device. In this manner, server side plug-in module 209 can generate a client side markup for each of the voice recognition scenarios, i.e. voice only through phone 80 or multimodal for device 30. By using a consistent client side model, application authoring for many different clients is significantly easier.

In addition to dynamically generating client side markups, high-level dialog modules, discussed below, can be implemented as a server-side control stored in store 211 for use by developers in application authoring. In general, the high-level dialog modules 211 would generate dynamically client-side markup and script in both voice-only and multimodal scenarios based on parameters specified by developers. The high-level dialog modules 211 can include parameters to generate client-side markups to fit the developers' needs.

Generation of Client Side Markups

As indicated above, server side plug-in module 209 outputs client side markups when a request has been made from the client device 30. In short, the server side plug-in module 209 allows the website, and thus, the application and services provided by the application to be defined or constructed. The instructions in the server side plug-in module 209 are made of a complied code. The code is run when a web request reaches the web server 202. The server side plug-in module 209 then outputs a new client side markup page that is sent to the client device 30. As is well known, this process is commonly referred to as rendering. The server side plug-in module 209 operates on "controls" that abstract and encapsulate the markup language, and thus, the code of the client side markup page. Such controls that abstract and encapsulate the markup language and operate on the webserver 202 include or are equivalent to "Servlets" or "Server-side plug ins" to name a few.

As is known, server side plug-in modules of the prior art can generate client side markup for visual rendering and interaction with the client device 30. U.S. Patent Application Publication US 2004/0113908 entitled "Web Server Controls for Web Enabled Recognition and/or Audible Prompting," published Jun. 17, 2004 and U.S. Patent Application Publication US 2004/0230637A1 entitled "Application Controls for Speech Enabled Recognition," published Nov. 18, 2004, both describe three different approaches in detail for extending the server side plug-in module 209 to include recognition and audible prompting extensions. Although aspects of the present invention can be used with all of these approaches, a brief description of one approach will be provided below for purposes of explaining an exemplary embodiment.

Figure 5:
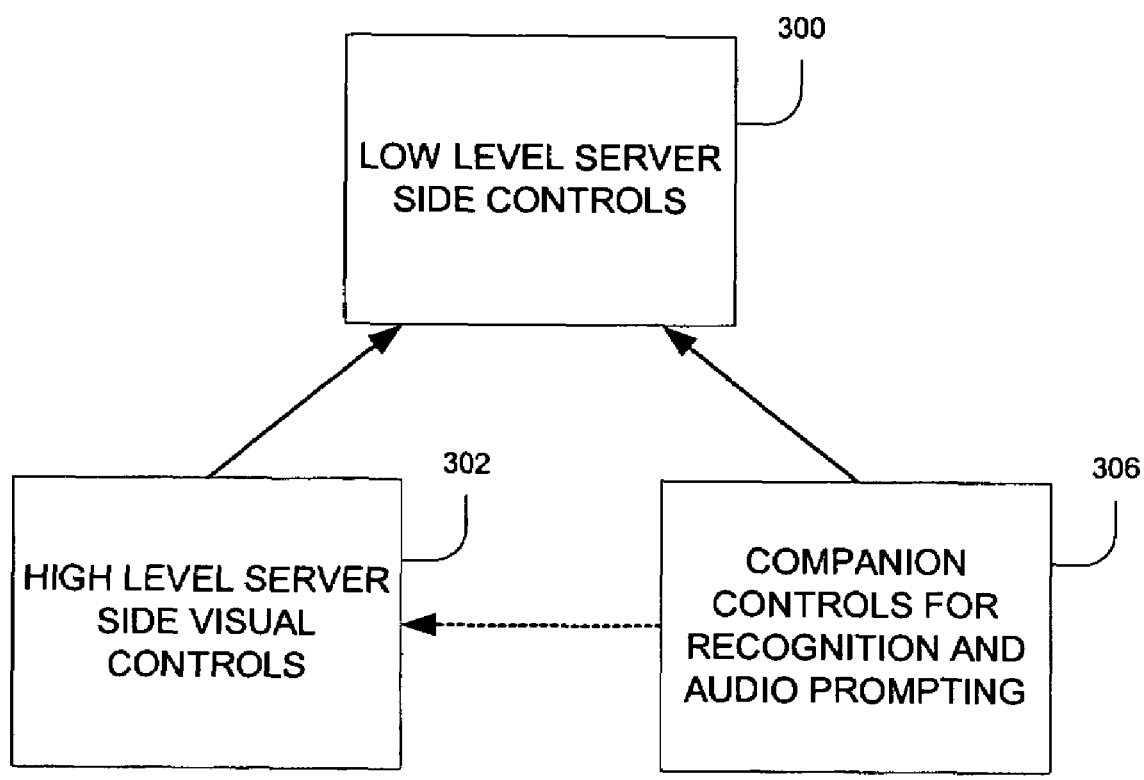
FIG. 5 is a block diagram illustrating an approach for providing recognition and audible prompting in client side markups.

Referring to FIG. 5, recognition/audible prompting controls 306 are separate from visual controls 302, but are associated selectively therewith as discussed below. In this manner, the controls 306 do not directly build upon the visual controls 302, but rather provide recognition/audible prompting enablement without having to rewrite the visual controls 302. The controls 306, like the controls 302, use a library 300. In this embodiment, library 300 includes both visual and recognition/audible prompting markup information.

There are significant advantages to this approach. Firstly, the visual controls 302 do not need to be changed in content. Secondly, the controls 306 can form a single module which is consistent and does not need to change according to the nature of the speech-enabled control 302. Thirdly, the process of speech enablement, that is, the explicit association of the controls 306 with the visual controls 302 is fully under the developer's control at design time, since it is an explicit and selective process. This also makes it possible for the markup language of the visual controls to receive input values from multiple sources such as through recognition provided by the markup language generated by controls 306, or through a conventional input device such as a keyboard. In short, the controls 306 can be added to an existing application authoring page of a visual authoring page of the server side plug-in module 209. The controls 306 provide a new modality of interaction (i.e. recognition and/or audible prompting) for the user of the client device 30, while reusing the visual controls' application logic and visual input/output capabilities. In view that the controls 306 can be associated with the visual controls 302 whereat the application logic can be coded, controls 306 may be hereinafter referred to as "companion controls 306" and the visual controls 302 be referred to as "primary controls 302". It should be noted that these references are provided for purposes of distinguishing controls 302 and 306 and are not intended to be limiting. For instance, the companion controls 306 could be used to develop or author a website that does not include visual renderings such as a voice-only website. In such a case, certain application logic could be embodied in the companion control logic.

Figure 6:
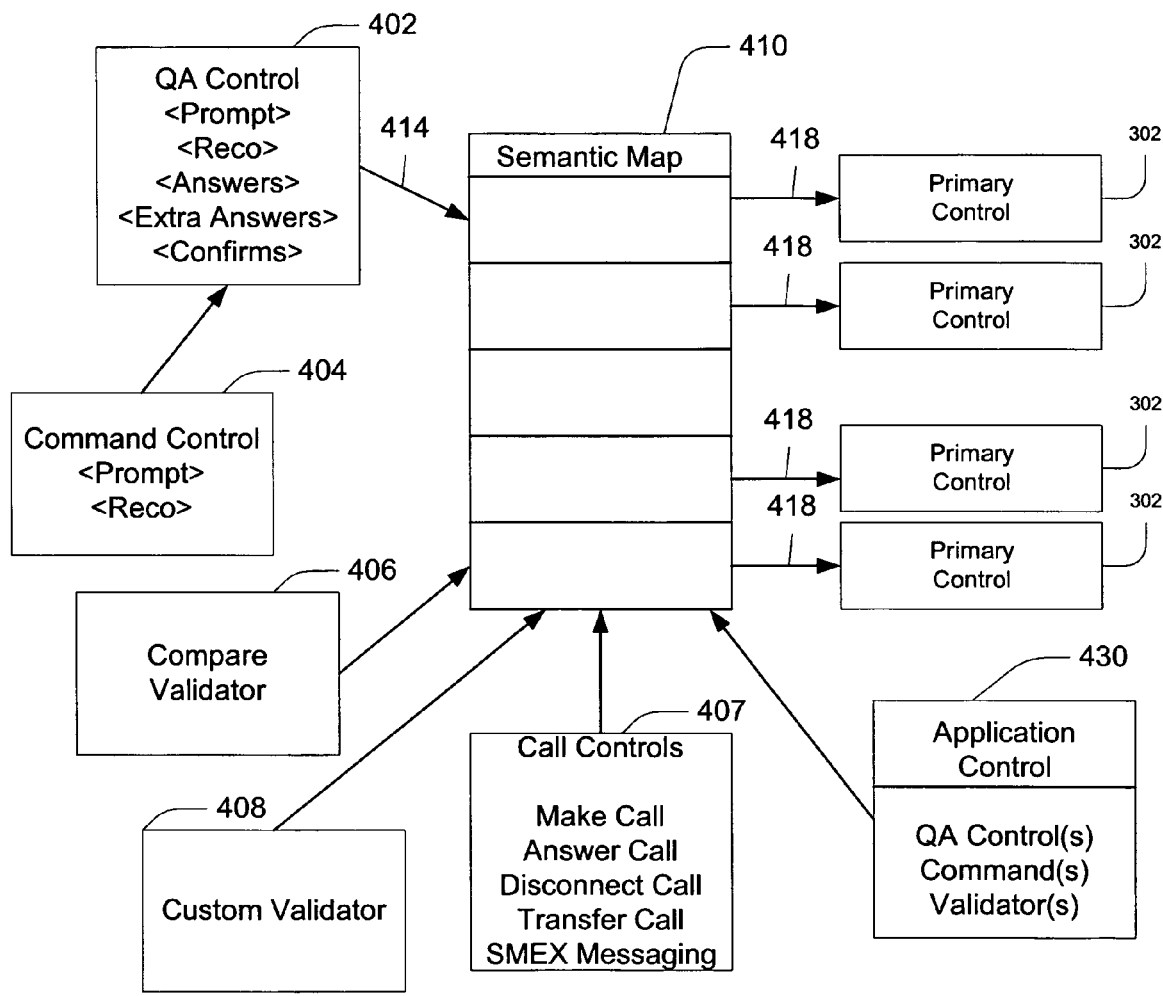
FIG. 6 is a block diagram illustrating companion controls.

A exemplary set of companion controls 400 is illustrated in FIG. 6. In this embodiment, the companion controls 400 generally include a QA control 402, a Command control 404, a CompareValidator control 406, a Custom Validator control 408 and a semantic-map 410. The semantic map 410 schematically illustrated and includes semantic items 412, which can be considered as input fields, that form a layer between the visual domain primary controls 402 (e.g. HTML and a non-visual recognition domain of the companion controls 400.

The QA control 402 includes a Prompt property that references Prompt objects to perform the functions of output controls, i.e. that provide "prompting" client side markups for human dialog, which typically involves the playing of a pre-recorded audio file, or text for text-to-speech conversion, the data included in the markup directly or referenced via a URL. Likewise, the input controls are embodied as the QA control 402 and Command Control 404 and also follow human dialog and include the Prompt property (referencing a Prompt object) and an Answer property that references at least one Answer object. Both the QA control 402 and the Command control 404 associate a grammar with expected or possible input from the user of the client device 30 .

At this point, it may be helpful to provide a short description of each of the controls.

QA Control

In general, the QA control 402 through the properties illustrated can perform one or more of the following: provide output audible prompting, collect input data, perform confidence validation of the input result, allow confirmation of input data and aid in control of dialog flow at the website, to name a few. In other words, the QA control 402 contains properties that function as controls for a specific topic.

The QA control 402, like the other controls, is executed on the web server 202, which means it is defined on the application development web page held on the web server using the server-side markup formalism (ASP, JSP or the like), but is output as a different form of markup to the client device 30. Although illustrated in FIG. 6 where the QA control appears to be formed of all of the properties Prompt, Reco, Answers, ExtraAnswers and Confirms, it should be understood that these are merely options wherein one or more may be included for a QA control.

At this point it may be helpful to explain use of the QA controls 402 in terms of application scenarios. Referring to FIG. 6 and in a voice-only application QA control 402 could function as a question and an answer in a dialog. The question would be provided by a Prompt object, while a grammar is defined through grammar object for recognition of the input data and related processing on that input. An Answers property associates the recognized result with a SemanticItem 412 in the Semantic Map 410 using an Answer object, which contains information on how to process recognition results. Line 414 represents the association of the QA control 402 with the Semantic Map 410, and to a SemanticItem 412 therein. Many SemanticItems 412 are individually associated with a visual or primary control 302 as represented by line 418, although one or more SemanticItems 412 may not be associated with a visual control and used only internally. In a multimodal scenario, where the user of the client device 30 may touch on the visual textbox, for example with a "TapEvent", an audible prompt may not be necessary. For example, for a primary control comprising a textbox having visual text forming an indication of what the user of client device should enter in the corresponding field, a corresponding QA control 402 may or may not have a corresponding prompt such as an audio playback or a text-to-speech conversion, but would have a grammar corresponding to the expected value for recognition, and event handlers to process the input, or process other recognizer events such as no speech detected, speech not recognized, or events fired on timeouts.

In a further embodiment, the recognition result includes a confidence level measure indicating the level of confidence that the recognized result was correct. A confirmation threshold can also be specified in the Answer object, for example, as ConfirmThreshold equals 0.7. If the confirmation level exceeds the associated threshold, the result can be considered confirmed.

It should also be noted that in addition, or in the alternative, to specifying a grammar for speech recognition, QA controls and/or Command controls can specify Dtmf (dual tone modulated frequency) grammars to recognize telephone key activations in response to prompts or questions.

At this point it should be noted that when a Semanticitem 412 of the Semantic map 410 is filled, through recognition for example, speech or Dtmf, several actions can be taken. First, an event can be issued or fired indicating that the value has been "changed". Depending on if the confirmation level was met, another event that can be issued or fired includes a "confirm" event that indicates that the corresponding semantic item has been confirmed. These events are used for controlling dialog.

The Confirms property can also include answer objects having the structure similar to that described above with respect to the Answers property in that it is associated with a SemanticItem 412 and can include a ConfirmThreshold if desired. The Confirms property is not intended to obtain a recognition result per se, but rather, to confirm a result already obtained and ascertain from the user whether the result obtained is correct. The Confirms property is a collection of Answer objects used to assert whether the value of a previously obtained result was correct. The containing QA's Prompt object will inquire about these items, and obtains the recognition result from the associated SemanticItem 412 and forms it in a question such as "Did you say Seattle?" If the user responds with affirmation such as "Yes", the confirmed event is then fired. If the user responds in the negative such as "No", the associated SemanticItem 412 is cleared.

The Confirms property can also accept corrections after a confirmation prompt has been provided to the user. For instance, in response to a confirmation prompt "Did you say Seattle?" the user may respond "San Francisco" or "No, San Francisco", in which case, the QA control has received a correction. Having information as to which SemanticItem is being confirmed through the Answer object, the value in the SemanticItem can be replaced with the corrected value. It should also be noted that if desired, confirmation can be included in a further prompt for information such as "When did you want to go to Seattle?", where the prompt by the system includes a confirmation for "Seattle" and a further prompt for the day of departure. A response by the user providing a correction to the place of destination would activate the Confirms property to correct the associated semantic item, while a response with only a day of departure would provide implicit confirmation of the destination.

The ExtraAnswers property allows the application author to specify Answer objects that a user may provide in addition to a prompt or query that has been made. For instance, if a travel oriented system prompts a user for a destination city, but the user responds by indicating "Seattle tomorrow", the Answers property that initially prompted the user will retrieve and therefore bind the destination city "Seattle" to the appropriate SemanticItem, while the ExtraAnswers property can process "Tomorrow" as the next succeeding day (assuming that the system knows the current day), and thereby, bind this result to the appropriate SemanticItem in the Semantic Map. The ExtraAnswers property includes one or more Answer objects defined for possible extra information the user may also state. In the example provided above, having also retrieved information as to the day of departure, the system would then not need to reprompt the user for this information, assuming that the confirmation level exceeded the corresponding ConfirmThreshold. If the confirmation level did not exceed the corresponding threshold, the appropriate Confirms property would be activated.

Command Control

Command controls 404 are user utterances common in voice-only dialogs which typically have little semantic import in terms of the question asked, but rather seek assistance or effect navigation, e.g. help, cancel, repeat, etc. The Command control 404 can include a Prompt property to specify a prompt object. In addition, the Command control 404 can be used to specify not only the grammar (through a Grammar property) and associated processing on recognition (rather like an Answer object without binding of the result to an SemanticItem), but also a 'scope' of context and a type. This allows for the authoring of both global and context-sensitive behavior on the client side markup. The Command control 404 allows additional types of input such as "help" commands, or commands that allow the user of the client device to navigate to other selected areas of the website.

CompareValidator Control

The CompareValidator control compares two values according to an operator and takes an appropriate action. The values to be compared can be of any form such as integers, strings of text, etc. The CompareValidator includes a property SematicItemtoValidate that indicates the SemanticItem that will be validated. The SemanticItem to be validated can be compared to a constant or another SemanticItem, where the constant or other SemanticItem is provided by properties ValuetoCompare and SematicItemtoCompare, respectively. Other parameters or properties associated with the CompareValidator include Operator, which defines the comparison to be made and Type, which defines the type of value, for example, integer or string of the semantic items.

If the validation associated with the CompareValidator control fails, a Prompt property can specify a Prompt object that can be played instructing the user that the result obtained was incorrect. If upon comparison the validation fails, the associated SemanticItem defined by SematicItemtoValidate is indicated as being empty, in order that the system will reprompt the user for a correct value. However, it may be helpful to not clear the incorrect value of the associated SemanticItem in the Semantic Map in the event that the incorrect value will be used in a prompt to the user reiterating the incorrect value. The CompareValidator control can be triggered either when the value of the associated SemanticItem changes value or when the value has been confirmed, depending on the desires of the application author.

CustomValidator Control

The CustomValidator control is similar to the CompareValidator control. A property SematicItemtoValidate indicates the SemanticItem that will be validated, while a property ClientValidationFunction specifies a custom validation routine through an associated function or script. The function would provide a Boolean value "yes" or "no" or an equivalent thereof whether or not the validation failed. A Prompt property can specify a Prompt object to provide indications of errors or failure of the validation. The CustomValidator control can be triggered either when the value of the associated SemanticItem changes value or when the value has been confirmed, depending on the desires of the application author.

Control Execution Algorithm

A client-side script or module (herein referred to as "RunSpeech") is provided to the client device for the controls of FIG. 6. The purpose of this script is to execute dialog flow via logic, which is specified in the script when executed on the client device 30, i.e. when the markup pertaining to the controls is activated for execution on the client due to values contained therein. The script allows multiple dialog turns between page requests, and therefore, is particularly helpful for control of voice-only dialogs such as through telephony browser 216. The client-side script RunSpeech is executed in a loop manner on the client device 30 until a completed form is submitted, or a new page is otherwise requested from the client device 30.

Generally, in one embodiment, the algorithm generates a dialog turn by outputting speech and recognizing user input. The overall logic of the algorithm is as follows for a voice-only scenario (reference is made to U.S. Patent Application Publication US 2004/0113908 entitled "Web Server Controls for Web Enabled Recognition and/or Audible Prompting," published Jun. 17, 2004 for properties or parameters not otherwise discussed above):
1. Find the first active (as defined below) QA, CompareValidator or CustomValidator control in speech index order.
2. If there is no active control, submit the page.
3. Otherwise, run the control.

A QA is considered active if and only if:
1. The QA's clientActivationFunction either is not present or returns true, AND
2. If the Answers property collection is non empty, the State of all of the SemanticItems pointed to by the set of Answers is Empty OR
3. If the Answers property collection is empty, the State at least one SemanticItem in the Confirm array is NeedsConfirmation.

However, if the QA has PlayOnce true and its Prompt has been run successfully (reached OnComplete) the QA will not be a candidate for activation.

A QA is run as follows:
1. If this is a different control than the previous active control, reset the prompt Count value.
2. Increment the Prompt count value
3. If PromptSelectFunction is specified, call the function and set the Prompt's inlinePrompt to the returned string.
4. If a Reco object is present, start it. This Reco should already include any active command grammar.

A Validator (either a CompareValidator or a CustomValidator) is active if:
1. The SemanticItemToValidate has not been validated by this validator and its value has changed.

A CompareValidator is run as follows:
1. Compare the values of the SemanticItemToCompare or ValueToCompare and SemanticItemToValidate according to the validator's Operator.
2. If the test returns false, empty the text field of the SemanticItemToValidate and play the prompt.
3. If the test returns true, mark the SemanticItemToValidate as validated by this validator.

A CustomValidator is run as follows:
1. The ClientValidationFunction is called with the value of the SemanticItemToValidate.
2. If the function returns false, the semanticItem cleared and the prompt is played, otherwise as validated by this validator.

A Command is considered active if and only if:
1. It is in Scope, AND
2. There is not another Command of the same Type lower in the scope tree.

In the multimodal case, the logic is simplified to the following algorithm:
1. Wait for triggering event—i.e., user tapping on a control;
2. Collect expected answers;
3. Listen in for input;
4. Bind result to SemanticItem, or if none, throw event;
5. Go back to 1.

In a multi-model environment, it should be noted that if the user corrects the text box or other input field associated with a visual presentation of the result, the system can update the associated SemanticItem to indicate that the value has been confirmed.

In a further embodiment as illustrated in FIG. 6, call controls 407 are provided that enable application authors to create speech applications that handle telephony transactions as well as an application control 430, which provides a means to wrap common speech scenarios in one control. Call controls 407 and application control 430 are not necessary for practicing the present invention, but are merely mentioned for the sake of completeness. A further discussion of each is provided in U.S. Patent Application Publication US 2004/0113908 entitled "Web Server Controls for Web Enabled Recognition and/or Audible Prompting," published Jun. 17, 2004 and U.S. Patent Application Publication US 2004/0230637A1 entitled "Application Controls for Speech Enabled Recognition," published Nov. 18, 2004.

Recording User Interaction Data

Using by way of example the foregoing structure, an application developer can develop a speech enabled application. However, aspects described herein allow the developer to record or log user interaction data.

Nevertheless, it should be understood that the concepts herein described are not limited to the dialog authoring structure described above to provide a dialog model, but rather can be applied to any authoring tool that generates a dialog model such as but not limited to those implemented as middleware, APIs (application program interfaces) or the like, and configured to record some or all of the information described below. In addition, the functional nature of speech enabled application such as telephony applications and the specifics of their voice user interfaces can differ widely across domains and application types so any automated logging enabled typically is only heuristic and not deterministic. For this reason, an implementation of this is likely to implement the automated log event properties as overridable defaults, rather than unchangeable properties. Nevertheless to simplify and facilitate the logging of rich information is still a big advance over systems relying on manual and programmatic authoring.

Referring back to FIG. 4, web server 202 executing the speech enabled application pursuant to dialog controls 211, records user interaction log data in store 217 as the application executes for any type of user such as but not limited to access via mobile device 30 or via phone 80.

The application is commonly, all that not exclusively, defined or written as a set of hierarchical controls herein exemplified typically by QA Controls 402 in conjunction with Command Control 404, Application Control 430, Call Control 407 and Validators 406 and 408 as required. The hierarchy defines an overall task to be completed as well as sub-tasks thereof to complete the overall task. The number of levels in the hierarchy is dependent upon the complexity of the application. For instance, an application can be directed overall to making an airline reservation (i.e., the highest most task), while two major sub-tasks are directed to obtaining departure information and arrival information. Likewise, further sub-tasks can be defined for each of the major sub-tasks of obtaining departure information and obtaining arrival information, in particular, obtaining departure/arrival airport information, departure/arrival time, etc. These subtasks might appear in a sequence within their containing task.

Figure 7:
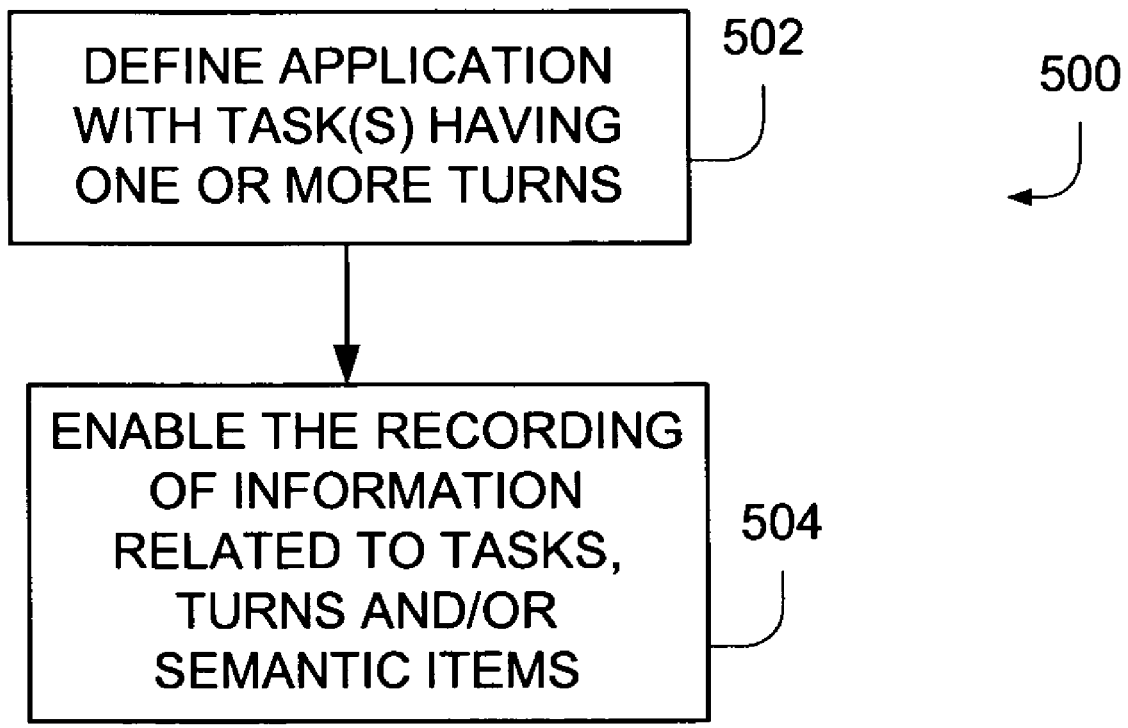
FIG. 7 is a flow chart of a method for creating a speech enabled application.

In general, two types of data are recorded, Task/Dialog data and Turn data. Beginning with Task/Dialog data, this data, as represented in the logs, should capture the hierarchical or sequential structure of the application in terms of tasks and subtasks. FIG. 7 illustrates a method 500 for creating an application. The dialog authoring tool enables the authoring or defining of dialogs at step 502 in terms of nested or sequential Task units, so that when a developer writes a speech enabled application, the author will typically write it in a modular fashion. That is, the author will be encouraged to group individual Turns into sets that accomplish a particular Task, and to group individual tasks into sets that accomplish higher level Tasks. Since the Task structure and the flow in and out of individual Tasks is known at design time, the logging of entry and exit to or from a Task is enabled (e.g. through TaskStart and TaskComplete events) as well as Turn data and values obtained from the user for input fields used by the application (herein exemplified as "semantic items") at step 504 to provide automated logging of the sequence and/or hierarchy of Task structure. This means that dialog flow, values obtained and Task structure can be explicitly recovered and built from the event logs. It should be noted that steps 502 and 504 are shown separately for purposes of explanation only in that some or all the features of these steps may be performed in a different order or concurrently.

This data also quantifies the success, failure or other (e.g. unknown) status of completing any given task or subtask. In addition, the Task/Dialog data includes a reason if the task is unsuccessful or fails, or the reason for which its completion status is not known, or if applicable the reason for succeeding if multiple reasons are possible for succeeding. Additional data can include progress data indicating if the user did not provide a response or the speech recognizer could not recognize the utterance. A list of input field values or storage locations used by the application for values based on or associated with prompts or user responses, or the status thereof that changed can also be recorded.

Figure 8:
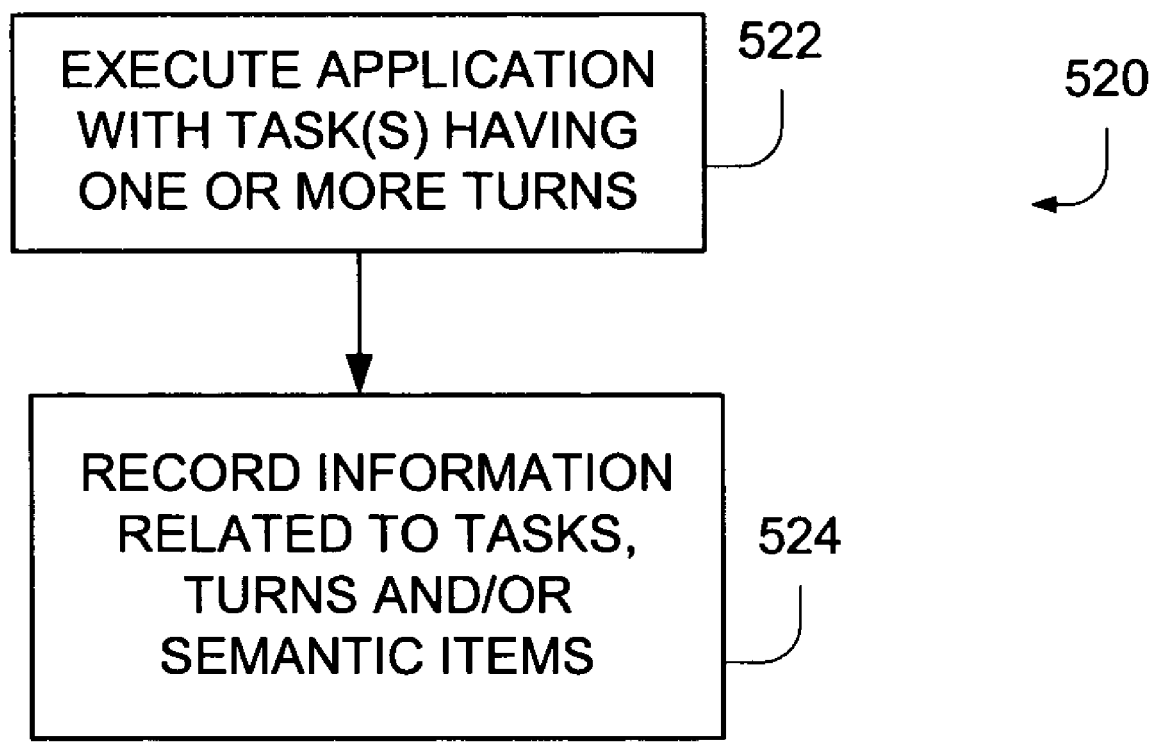
FIG. 8 is a flow chart a method of execution of a speech enabled application.
Figure 9:
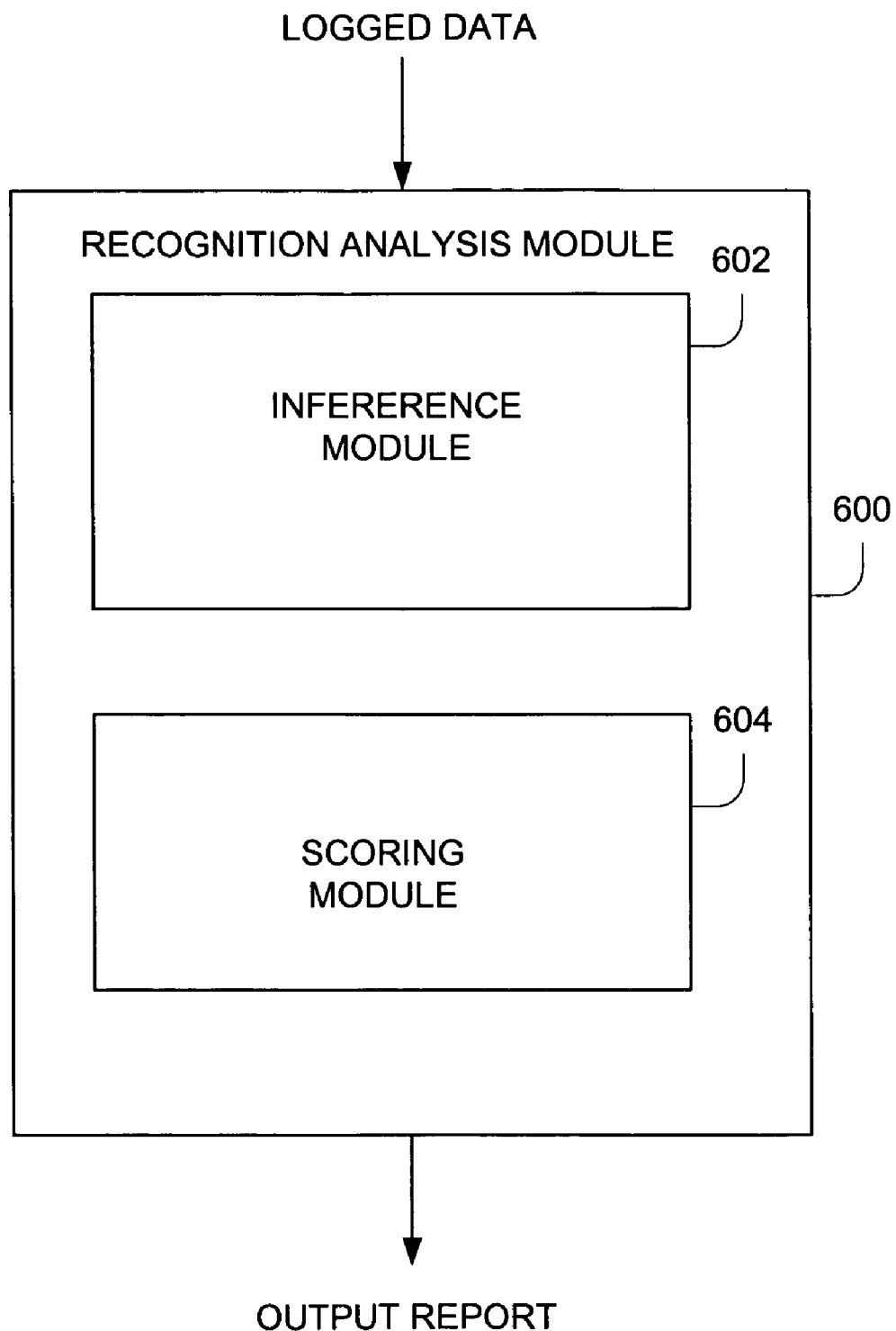
FIG. 9 is a block diagram of a recognition analysis module.

FIG. 8 illustrates a method 520 for execution of a speech enabled application. Method 520 includes executing a speech enabled application defined in terms of Task(s) having one or more Turns at step 522. Step 524 includes recording information related to Tasks, Turns and semantic items. It should be noted that steps 522 and 524 are shown separately for purposes of explanation only in that some or all the features of these steps may be performed in a different order or concurrently.

In one embodiment, the Task/Dialog data includes some or all of the following information:

Task/Dialog Data name: author-defined string identifier for Task/Dialog, e.g. "getCreditCardInfo", "ConfirmTravel", etc. If author supplies no name at design time, default names are given, e.g. Dialog1, Dialog2, DialogN, . . .

parent: name of containing Dialog (in order to reconstruct the dialog hierarchy from the logs)

TaskStart: the timestamp when the Task/Dialog is first entered

TaskComplete: the timestamp when the Task/Dialog is exited. This event should always be fired, bottom-up, for any open dialogs at the close of an application with default values (i.e. there will be no 'open-ended' dialogs in the logs).

status: completion status of the task/dialog, is settable by the author, automatically inferred based on performance of the dialog, or semi-automatically set based on author defined conditions. In one embodiment, the default value status may be "UNSET", where subsequent values can be one of:
SUCCESS
FAILURE
UNKNOWN Automatic Task Completion Status In certain cases, as indicated above, the status can be inferred with reasonable certainty from the nature of a task exit whether its status was one of success, failure, or unknown. For instance, a task that ends as a result of an error or exception can be automatically logged with completion status of Failure. Likewise, a cancelled task (e.g. where a Cancel ( ) method was called on the task object) can be automatically logged with completion status of Failure. Similarly, a task that ends as a result of a certain 'strikeout' (e.g. MaxSilences or MaxNoReco, discussed below) count being reached will be automatically logged with completion status of Failure.

In contrast, a task that ends naturally (i.e. it is not cancelled) with all semantic items (i.e. input fields for the application) of the Turns encountered in that task, or specified at design-time as belonging to that task, having grounded (user input or derived therefrom) values will be logged automatically with completion status of Success.

Semi-automated Task Completion

Partial automation of task status logging is also useful. For any given task, the author can specify or define a set of conditions at step 502 for task success or failure, which, if met determine the status of the task at any point of exit. The conditions may be programmatic (e.g. foo=='bar'), or more helpfully, conditions can be simplified such that the author need only specify one or more semantic items per task (e.g. values provided for departureCity and arrivalCity), and the system will automatically log Success when those semantic items have confirmed values, and, optionally, Failure when those semantic items do not have confirmed values.

This aspect is a useful time-saving mechanism since it means that the task status logging need not be programmatically coded on every exit point from a task. Instead, the conditions are automatically evaluated whenever an end-user exits the task, and the status determined and logged without extra developer code.

reason: reason for the completion of the dialog, can be set by author, e.g.

Command—command spoken by user to change to different portion of dialog, and the nature of the command (e.g. "Cancel", "Operator", "Main Menu", etc.;

userHangup—user hung up or otherwise quit or gave up;

applicationError—application error occurred maxNoRecos—maximum number of utterances without recognition reached;

maxSilences—maximum number of silent user responses reached;

SemanticUpdate:

items: list of any semantic items whose value/status were changed, including new values and corresponding statuses. Typically, this data is correlated with the Turn data, discussed below, in that with each dialog turn (prompt by application/response or lack thereof by user) one or more of the semantic items values and/or status will change. However, in some instances the application may change a semantic item by itself. For instance, if the application is unable to validate a value such as a credit card number, it might clear the value by itself and not necessarily based on a dialog turn. Such a change would be recorded nevertheless.

The Turn data comprises direct interaction with the application and is organized based on prompts provided by the application (when no response is expected), or application prompts correlated to user responses or lack thereof, in other words a prompt/response exchange, or commands provided by the user not necessarily in response to a prompt, or at least a response that is not expected to be a response to the prompt. Accordingly, the three areas of data that can be recorded include the information related to the prompt provided by the application, the response (be it an expected or unexpected response) provided by the user and the recognition result determined by the system. In one embodiment, the Turn data includes some or all of the following information:

Turn Data config
- name: author-defined string identifier. If author supplies no name at design time, default names can be given; however, there is a need to clearly and consistently distinguish between different turns within the same Dialog/Task. A possible technique is to base the name and the type of prompt.
- type: The specification of the purpose of a particular Turn can be inferred from the nature of the semantic items associated with it. In the case of the foregoing description above, semantic items are associated with a Turn through the notion of Answers, ExtraAnswers and Confirms.
- Examples of Turn purpose include:
- Ask for new information (Turn enables Answers)
- Confirm related information (accepting/denying, Turn enables Confirms)
- Give an informational statement (Turn holds no Answers or Confirms).
- parent: name of containing Dialog/Task (in order to reconstruct the dialog hierarchy from the logs).
- language: language being used.
- speech grammars: information related to which speech recognition grammars are being used.
- DMTF grammars: information related to which DMTF recognition grammars are being used.
- thresholds: confidence thresholds for rejecting a value and/or confirming a value.
- timeouts: time periods allowed for initial silence following the prompt, end silence for determining the end of response and the time period considered to be babble.

prompt
- name: optional may not be necessary in that the turn data name can be used.
- type: A dialog model may contain a number of predefined prompt types, any of which can be selected by the application, and the usage of which allows recording what the system is trying to do to achieve, i.e. the purpose of the Turn.
- Examples of prompt types include:
- MainPrompt—asking a question (or giving a statement)
- HelpPrompt—providing help
- RepeatPrompt—repeating informational content
- NoRecognitionPrompt—responding to a 'no recognition'
- SilencePrompt—responding to a silence
- EscalatedNoRecognitionPrompt—responding to a 'no recognition' after multiple tries
- EscalatedSilencePrompt—responding to a silence after multiple tries Since these types are pre-defined and available for selection at any time, they can be logged automatically by type, which enriches the log data automatically with the notion of the purpose of a given prompt to attain the goal of the Turn.

Thus, the prompt type combined with the Turn type—all of which are programming primitives in the dialog authoring model and are thus automatically logged when encountered by the application
- allows a rich view of the system's purpose at any point in the logs.
- semantic items: the semantic item(s) that are prompted about (used to link ask/confirm cycles, etc.)

The dialog model uses the notion of semantic items, each containing a value and a status, in order to simplify about dialog flow authoring. By logging the changing value and status of every semantic item automatically, and combining that with tasks and user/system move information, the logs are further enriched.

The Answers/ExtraAnswers/Confirms model links semantic items to Turns and therefore Tasks. Therefore it is known (and can be logged automatically), which semantic items are relevant to which system moves and which user moves, and which contribute to which Tasks.
- textual content of the prompt: e.g. "welcome"
- bargein: on/off/mid-prompt time
- User Perceived Latency: the time period between a user's response and the playing of the next prompt. When a system is under heavy load, the time period may be longer, which could cause the user to be confused in that the user may believe the application is not responding.
- TTS: True/False—was text-to-speech being used to generate the prompt.
- prompt completion time: the time the prompt was completed/cut-off.
- prompt wave file: the actual prompt provided.

user input:
- mode: whether the user is providing DTMF/speech
- type: whether the user is providing a Command, and if so what type (e.g. Help/Repeat/etc.), or whether the user is providing a Response, and if so what type (Answer/Confirm/Deny)

The dialog model categorizes the functions of the application's grammars into different types of user response that indicate the purpose(s) of the user in providing the response, i.e. Answer, Accept, Deny, etc. These types can be logged directly as indicators of what the system believes the user is trying to accomplish. Examples of different response types are as follows:
- Answer—the user provided an answer to a question requesting a value.
- ExtraAnswer—the user provided an answer that was beyond the focus of the question.
- Accept—the user confirmed a piece of information.

Deny—the user refuted a piece of information.
Help Command—the user asked for help.
Repeat Command—the user requested a repetition of information.
Other Command—the user issued some other form of command (not explicitly typed, but we know it wasn't any of the above types).
Silence—the user did not say anything (this is sometimes used as a form of 'implicit acceptance').

Because these types are associated with particular grammars, they can be logged automatically whenever the user says something that matches the corresponding grammar. Many systems allow a single dialog turn to include multiple types—e.g. acceptance of more than one item, or answering one item and accepting another in a single turn.

Silence: If silence is detected, which number or count is it relative to MaxSilences.
NoReco: If no recognition is detected for the utterance, which number or count is it relative to MaxNoRecos.
Error: If an error occurred was it thrown by the application or the platform.

result:
Recognition result: Recognition result returned by the system. Commonly, the recognition result includes semantic markup language (SML) tags for the interpreted utterance. In addition, N-Best alternative interpretations can be provided, and audio recording results where appropriate.
In addition for each interpretation:
utterance text without SML tags (if speech is provided ) or keypresses (if DTMF is provided).
confidence: confidence level of the interpretation.
semantic mappings: link between parts of the SML result and the semantic items. In other words, what values from the SML result will be placed in which semantic items.
grammar rule matched: which rule in the grammar was matched by the users input.
confidence: of utterance as a whole.
bargein: timing of barge in by the user, or NULL (if no barge in was present).
recognition wave file: actual recorded user input or a pointer to it.

In summary, the logged user interaction data allows the dialog to be seen as a hierarchical or sequential structure of tasks operating on certain fields of interest (e.g. form fields, or slot values), and each dialog turn within a task logs both the system purpose (the dialog move) with respect to the form fields (e.g. asking for the value, confirming it, repeating it, etc.), and what the speech recognizer believes to be the user purpose (e.g. supplying the value, denying it, asking for help, etc.).

Practical benefits are realized with this structure. In particular, analysis of system performance is improved in that a task completion of either success or failure is generally explicit, so transactional success rate reporting is greatly simplified, and the nature of the dialog steps taken to complete the task is better understood (because the purpose behind each step is known at authoring time).

Implementation of this form of data logging is easy due to the manner in which it is incorporated into the dialog authoring tools. The high level nature of this instrumentation is general to a wide variety of application types, and the actual details of the logging are facilitated at authoring-time by its integration into the authoring tools both conceptually and with respect to the logging primitives. So the application author is encouraged to structure the application using the task/subtask model and indicate which transitions out of a task indicate a successful completion, and they need not explicitly instrument the system/user purpose logging because that is built into the dialog turn authoring model.

Diagnosing Speech Recognition Problems

The description below enables application developers to tune an application to find significant recognition problems without the time and expense associated with transcriptions of recognized responses.

Referring to FIG. 7, recognition analysis module 600 receives input logged application data such as described above (although other forms of logged data can be used) and performs analysis thereof. In general, recognition analysis module 600 reveals recognition problems in an application, for instance, one or more recognition problems that a number of users are encountering. Recognition analysis module 600 receives the semantic information in the logged application data and determines if a good recognition was made for a given received response without performing transcription of the received response. Although determination is made at a semantic level, useful analysis data can be obtained for tuning the application.

Recognition analysis module 600 can use the following information from the logged data in a manner further described below. The information includes:
(a) information about the semantic values (i.e. the recognition result obtained from the recognizer for a received response) and the corresponding status values such as but not limited to "empty", "needs confirmation" or "confirmed";
(b) information about the task that the user is attempting to complete relative to the application, for example, book a flight, get your call transferred to a specific individual, etc. as well as the ending status of the task (e.g. "Success", "Failure", "Unknown"). In general, task information is used to group received responses such that, for example, if a task is successful you know that the received responses were correct; and
(c) information about the recognition state, i.e. grammars used, recognition result, etc. If validation is to be performed with re-recognition at analysis time, then the actual captured data (e.g. audio data of the user utterance) is required.

For explanation and understanding purposes, recognition analysis module 600 can be described as performing analysis in two main phases (exemplified herein by modules 602 and 604). Nevertheless, it should be understood a single pass implementation could also be performed. In addition, different variations to the analysis are possible, which are described below. Generally, the scoring measure is dependent on the nature of the inferences made. The choice of which one to use will typically depend on the nature of the application and the amount of log data available.

As exemplified herein, the recognition analysis module 600 can include an inference module 602 to infer the semantics of a given user response and a scoring module 604 to estimate semantic recognition accuracy in terms of semantic errors over a number of inferences. However, it should be understood that two separate modules are not required. In addition, although concepts embodied in modules 602 and 604 can be used advantageously in combination, module 602 can be used independently of the other. Reports or other suitable outputs can be provided in accordance with the analysis performed by modules 602 and 604.

Generally, analysis module 600 performs analysis that includes receiving information indicative of dialog turns between the system and at least one user; and associating a turn providing a response with an inferred value based on analyzing the received information without performing a transcription of user responses. Examples of these steps are discussed below with respect to FIGS. 10, 12 and 13.

As indicated above, inference module 602 attempts to infer the application storage location for the recognition results (i.e. semantic item(s)) and their values that could be associated with a turn or grammar, and annotates (i.e. associates) the turn with the inferred semantics. Note that this analysis generally includes a mapping procedure from the application storage location (semantic item) to the recognition result received from the recognizer that is common to the variations below. This aspect is also provided below.

Scoring module 604 scores the turn (or grammar) against the inferred semantics. Note that this analysis can be conducted not only on the original recognition results but also on any subsequent re-recognitions of the audio data (e.g. re-recognitions for the purpose of validating the accuracy of any changes to grammars, etc. as a result of the application tuning process). In other words, for re-recognition of the audio data, module 602 need not be operated again, but rather just module 604.

First Variation (Uses Confirmation Information Only)

Figure 10:
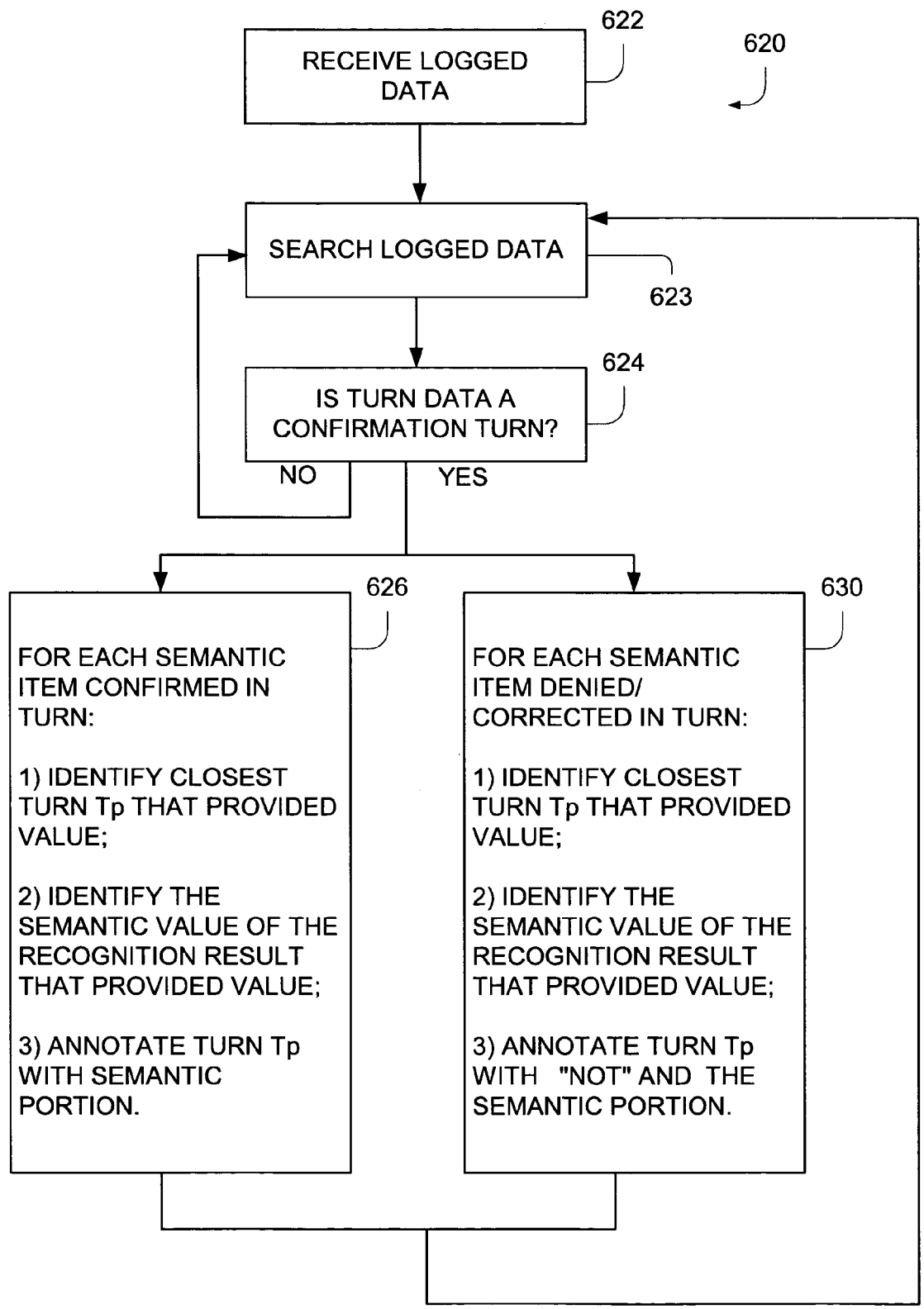
FIG. 10 is a flow chart of a first method for inferring semantics from a given user response.
Figure 11:
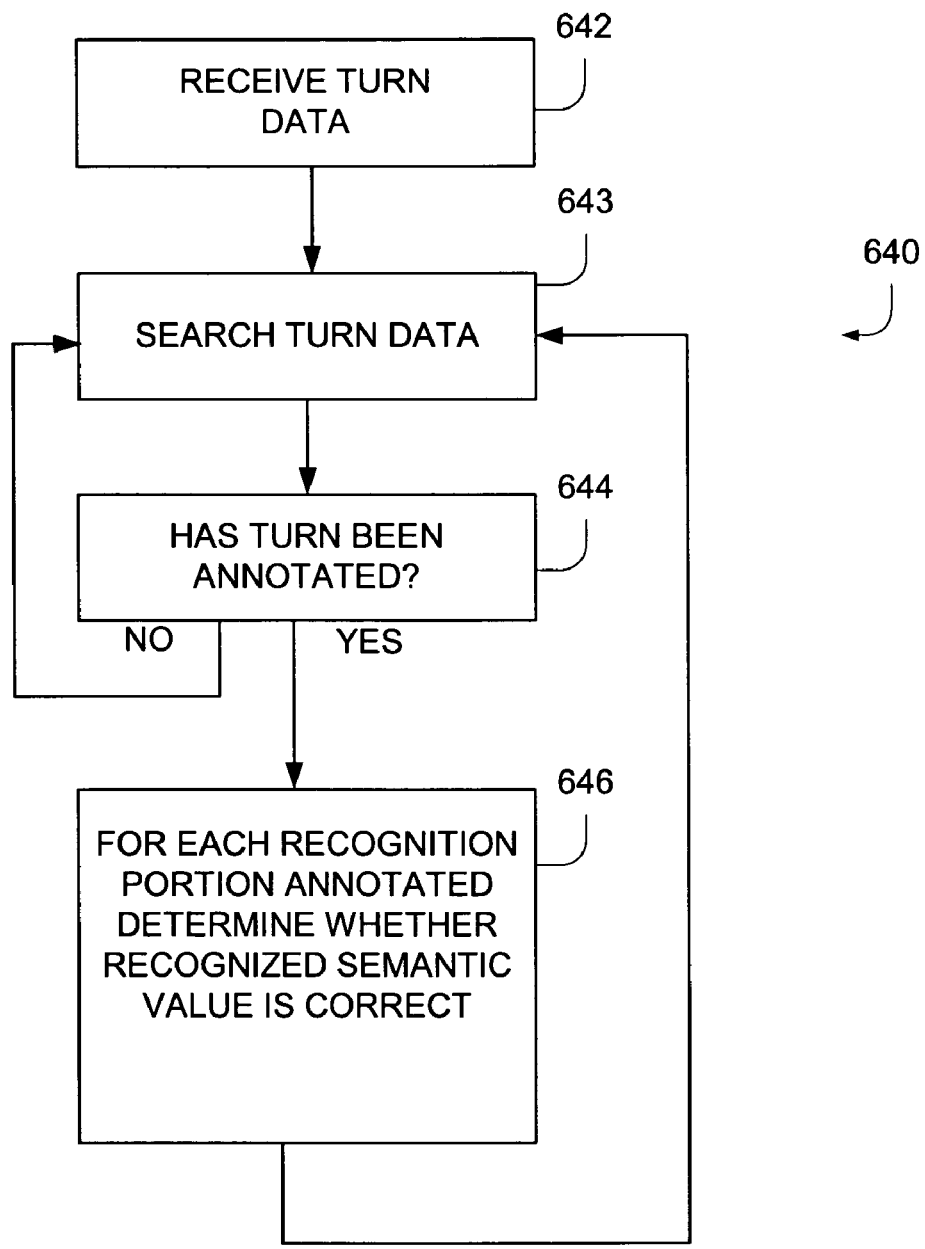
FIG. 11 is a flow chart of a first method for scoring inferences.

A first variation of analysis for modules 602 and 604 are illustrated in FIGS. 10 and 11, respectively. In general, this inference analysis is performed using only confirmation information.

Referring to FIG. 10, semantic inferences are made using method 620. (Note in the description below references to "semantic item" is considered a storage location or input field for a recognized result used by the application.) Log data is received at step 622. The logged turn data is searched at step 623 such that for each Turn in which a semantic item is known to be confirmed (Tc) (step 624), then for each semantic item confirmed (SIc) in Tc (step 626), then identify Tp, where Tp=the closest prior Turn in which the SIc value was provided;

identify Rp, where Rp=the semantic portion of the recognition result that is mapped to the SIc value; and the identified prior turn Tp is then annotated with Rp.

(Stated another way, for this particular semantic item, the turn in which the answer was provided is annotated with the part of the recognition result that is believed the correct answer. Annotation here and as provided below may involve adding a field to the logged data indicating the correctness of the recognition result for the turn.)

Likewise, for each semantic item that is denied or corrected (Sid) in Tc (step 630), then identify Tp, where Tp=the closest prior Turn in which the Sid value was provided;

identify Rp, where Rp=the semantic portion of the recognition result is mapped to the Sic value the identified prior turn Tp is then annotated with "Not Rp".

(Stated another way, for this particular semantic item, the turn in which the answer was provided is annotated with the part of the recognition result that is believed not the correct answer.)

Referring to FIG. 11, scoring is performed via method 640. The scoring can be used to locate recognition problems. Turn data is received at step 642. The turn data is searched at step 643 such that for each Turn that has been annotated as a result of method 620 (step 644), then for each recognition portion (Rp) annotated (step 646), then if Rp is found in the recognition result with the same value, then the recognized semantic value corresponding to Rp is correct; or if Rp is found in the recognition result with a different value, then the recognized semantic value corresponding to Rp is incorrect; or if Rp is not found in the recognition result (note, this will occur only for re-recognitions), then the recognized semantic value corresponding to Rp is probably unknown.

It should be noted that by finding the "closest prior turn" for Tp (rather than the "immediately prior turn" directly), this method enables inference where the confirmation happens several turns later than the provision of the semantics (e.g. after user mumbles, or where confirmation of several items takes place 'en bloc' rather than individually). This method is also robust in the face of denials or corrections, since Tp could be either an 'answering' turn or a 'correcting' turn.

Method 620 can be enhanced for robustness by applying task scoping information when it is known such that the analysis is bounded by a given task. This feature would be particularly helpful when an application uses the same semantic item for different tasks. In this case the following steps concerning Tp would be changed above:

for each semantic item confirmed (SIc) in Tc (step 626), then identify Tp, where Tp=the closest prior Turn within the containing task in which the SIc value was provided for each semantic item that is denied or corrected (SId) in Tc (step 630), then identify Tp, where Tp=the closest prior Turn within the containing task in which the SId value was provided Second Variation (Uses Confirmation and Task Information)

A limitation of the foregoing analysis is that it makes the assumption that all semantic items provided in Tp were recognized (correctly or incorrectly). So if the user provides two semantic items in a response (e.g. says "from Seattle to London") but the system only recognizes a single item (e.g. "from Seattle <mumble>") then that turn is always scored against the known value provided ("Seattle") and the missing value ("London") is never known in the analysis.

The following variant modifies this assumption by collecting all confirmed semantic items that are known at the end of the task with a status of "success" into an array, and annotates each turn within the task with the array. In this way, if re-recognition is conducted so that the missing value is recognized (e.g. if "London" was missing from the original grammar, but it is added to the new grammar), then the method of scoring will pick this up.

However, the trade-off is that this analysis is somewhat less robust to misrecognitions, since it will score correctly the provision of any semantic item that is eventually confirmed, even if that semantic item is the result of a misrecognition.

Figure 12:
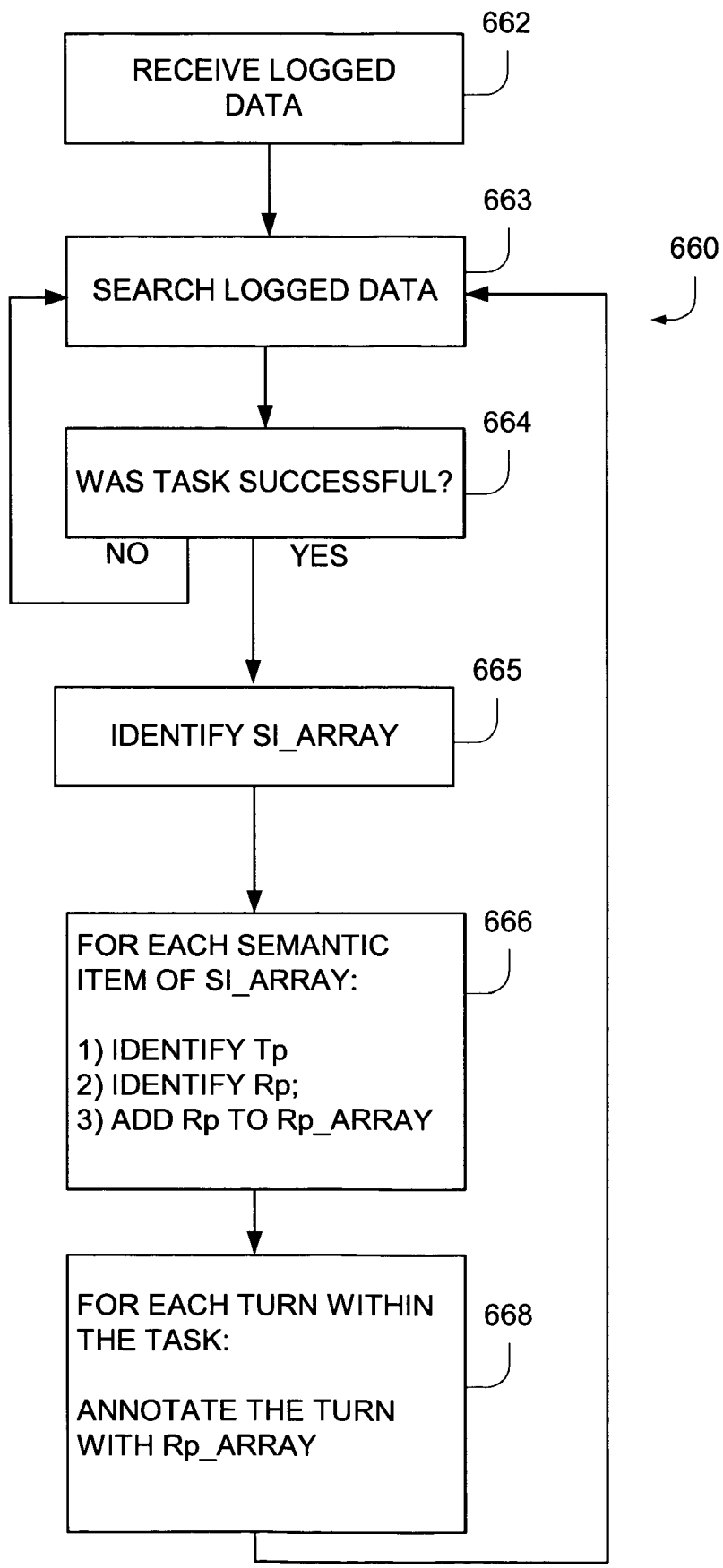
FIG. 12 is a flow chart of a second method for inferring semantics from a given user response.
Figure 13:
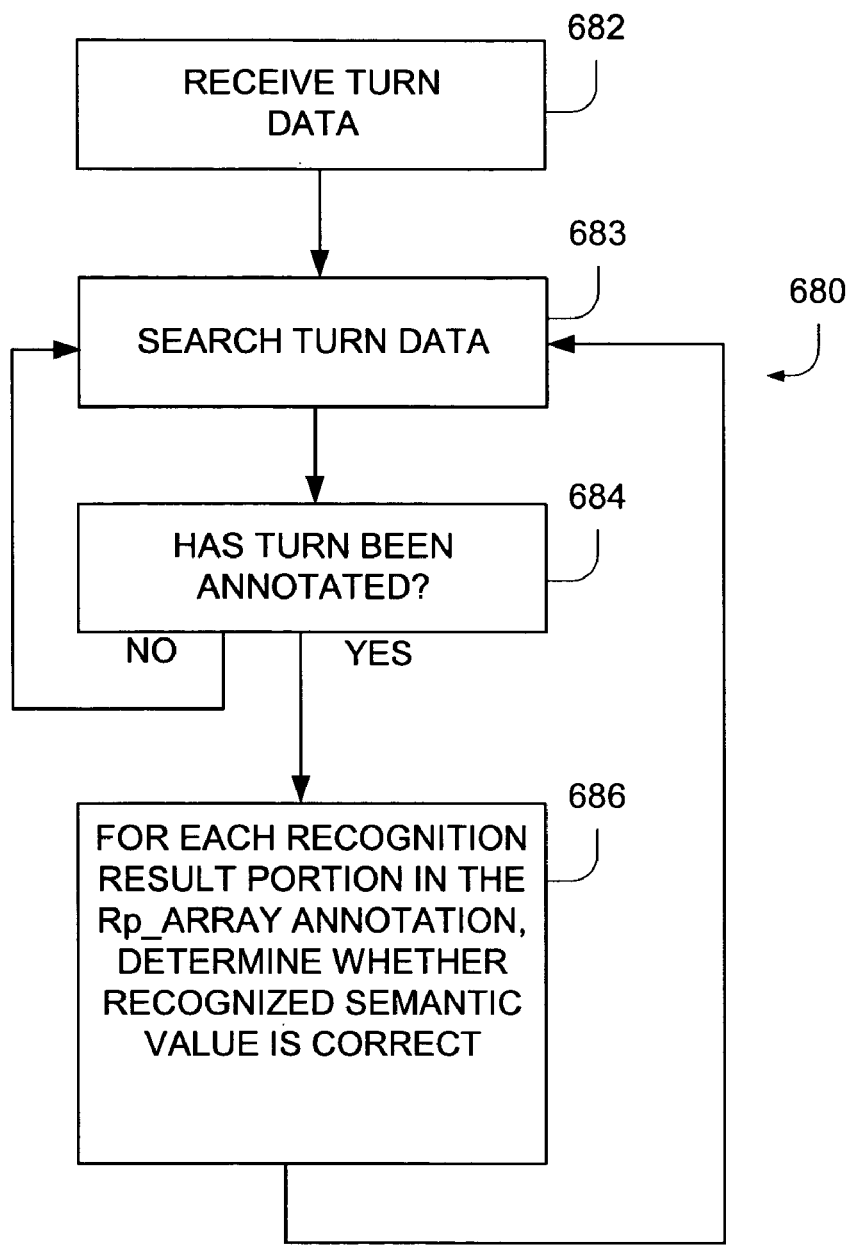
FIG. 13 is a flow chart of a second method for scoring inferences.

Referring to FIG. 12, semantic inferences are made by module 602 under this variation using method 660. Log data is received at step 662. The logged data is searched at step 663 such that for each task with completion status success (step 664), then
        identify Semantic Item Array (SIArray), where SIArray=the names and values of all semantic items associated with the task and with status "confirmed" on task completion
        for each member semantic item of SIArray (step 666), then
            identify the Turn Tp which provided the correct value for the semantic item;
            identify Rp, where Rp=the semantic portion of the recognition result in Tp that is mapped to the semantic item value; and
            Add Rp to RpArray
        for each Turn T within the task (step 668) (could be different than the set of Tp turns)
            Annotate T with RpArray Referring to FIG. 13, scoring is performed via method 680. Turn data is received at step 682. The turn data is searched such that for each Turn Tp that has been annotated (step 684)
        for each recognition result portion (Rp) in the RpArray annotation (step 686), then
            if Rp is found in the recognition result for Tp with the same value then, the recognized semantic value corresponding to Rp is correct; or
            if Rp is found in the recognition result for Tp with a different value then, the recognized semantic value corresponding to Rp is incorrect; or
            if Rp is not found in the recognition result, then the recognized semantic value corresponding to Rp is probably unknown.

Third Variation (for Scoring Confirmation Turns)

The variations above would be used for turns in which the user provides semantic items. The following variation can be used for turns in which the user accepts or denies semantics items in a confirmation turn such as where the user confirms a number of previously provided responses. With respect to the general method described above, the inferred value comprises acceptance or denial of the value in the confirmation turn, and associating the inferred value comprises associating the correctness of the acceptance or the denial.

Figure 14:
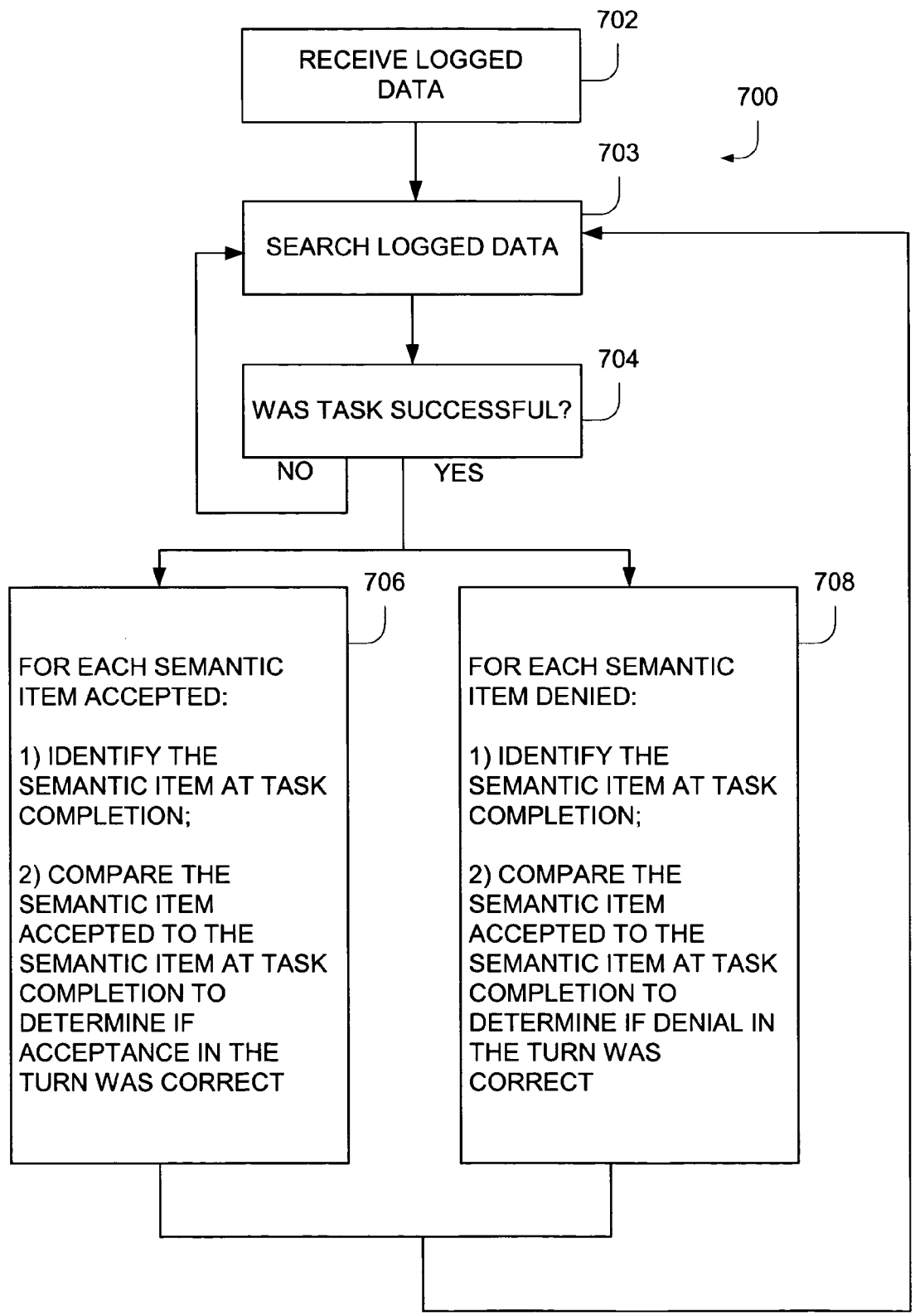
FIG. 14 is a flow chart of a method for scoring inferences of confirmation acceptances.

The method of analysis is illustrated in FIG. 14 at 700 and rates the accuracy of the acceptance/denial decision of the confirmation turn. Since the output is generally a score or other measure, module 604 will be used to represent performing method 700. Log data is received at step 702. The logged data is searched at step 703 such that for each Task with completion status is "success" (step 704), then
    for each Confirmation Turn (Tc) within the Task, then
        for each semantic item accepted (SIa) in Tc (status becomes confirmed) (step 706), then
            identify Sic, where SIc=the semantic item at Task completion time
            if the SIa value==the Sic value, then
                the acceptance in Tc is correct else
                The acceptance in Tc is incorrect for each semantic item SIc denied in Tc (status becomes empty and/or value changed) (step 708), then
            identify Sic, where SIc=the semantic item at Task completion time
            if SIa.value <> SIc.value, then
                the denial in Tc is correct else
                the denial in Tc is incorrect.

Mapping Between Semantic Items (SI) and Result Portions (Rp)

The recognized response or semantic values used and manipulated by the application (e.g. the semantic items, SI) are typically derived from portions of the recognition result of a user input (the Rp). In order for the first and second variations to work correctly, the mapping needs to be known between the Rp and the semantic item.

In many cases, the mapping may be explicit—for example, an Xpath associated with a semantic item that points into a particular portion of an XML recognition result. So for instance a FromCity semantic item might be associated with an XPath of the form "/SML/DepartureCity", which means that whatever value is found in the node <SML><DepartureCity>. . . </DepartureCity></SML>of an XML result should be bound to the semantic item value.

However, where the mapping is not explicit, e.g. an Xpath or other indication was not logged, or where the result was processed more programatically (e.g. the result was in the form of an object), the mapping needs to be inferred. This process is generally heuristic rather than deterministic.

Figure 15:
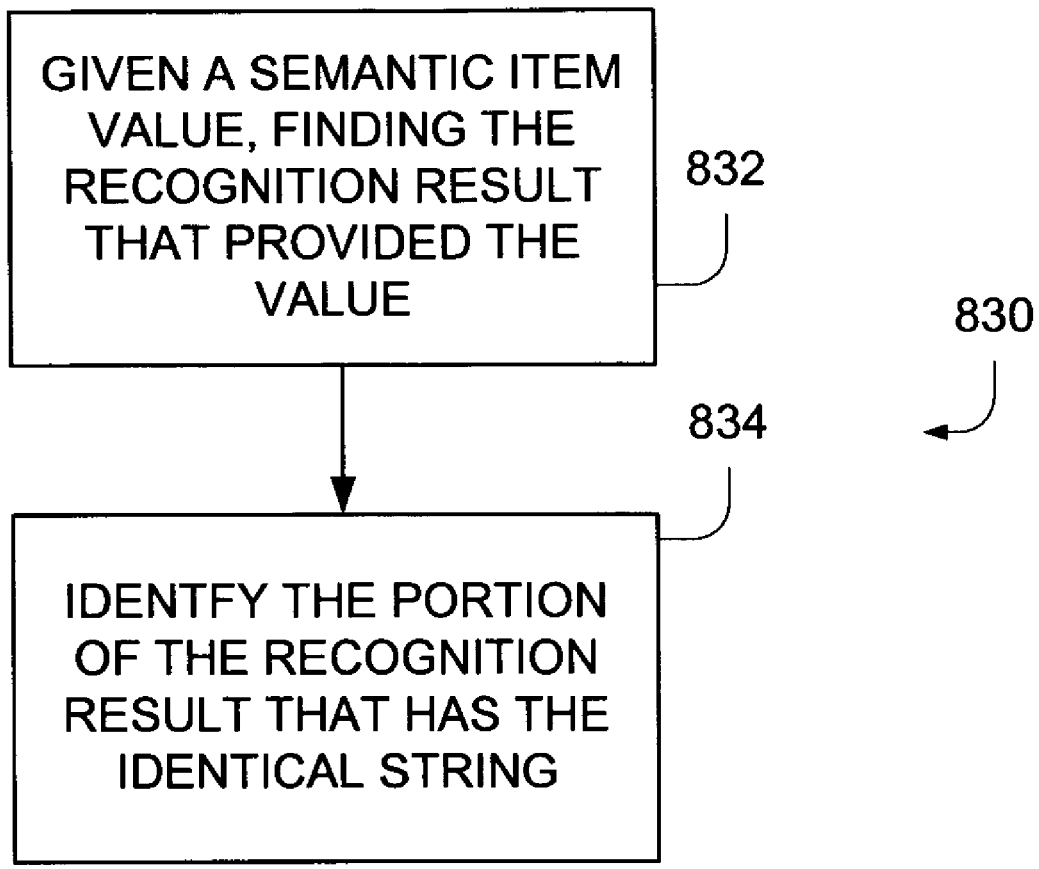
FIG. 15 is a flow chart of a first method for mapping semantic items to result portions.
Figure 16:
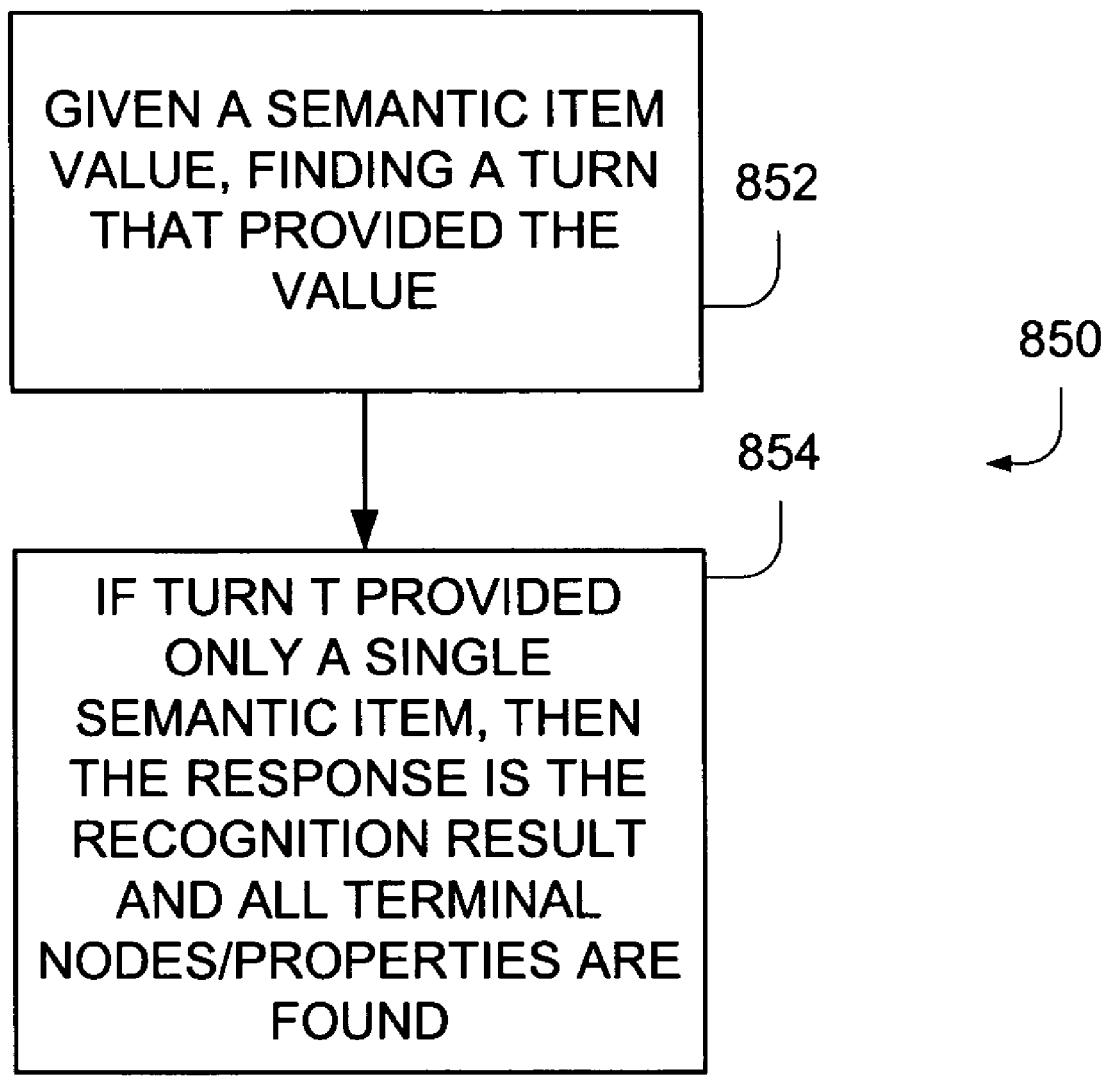
FIG. 16 is a flow chart of a second method for mapping semantic items to result portions.

FIGS. 15 and 16 illustrate methods for inferring a mapping between semantic items and recognition result of a user input. Referring first to FIG. 15, method 830, which comprises simple string identity mapping, includes given a semantic item value "v" where the semantic item was confirmed with that value (e.g. FromCity: "Seattle"), finding the recognition result "R" that initially provided value "v" at step 832. At step 834, the value in R is found that holds an identical string (i.e. DepartureCity node in <DepartureCity>Seattle</DepartureCity>, wherein the node or property containing that value is the recognition result portion Rp.

FIG. 16 illustrates method 850 that provides a result mapping inference. A more deterministic variant of this is possible where only a single semantic item is updated by a response. In this case, the entire result object can be associated with that semantic item. Method 850 then includes given a semantic item value "v" where the semantic item was confirmed with that value (e.g. FromCity: "Seattle"), finding a Turn T that initially provided value v at step 852. At step 854, if Turn T provided only a single semantic item, then R is the recognition result for Turn T, and all terminal nodes/properties in R (complete recognition result from which Rp is obtained, e.g. <City>Seattle</City>, are found, and those nodes or properties are the recognition result portion Rp.

The foregoing is more robust in many cases because it copes better with complex semantic results, including compositional results (e.g where a semantic item of "date" equals 20050601, and where semantics: <month>06</month><day>01</day><year>2005</year>). However, it cannot cope with multi-semantic items (i.e. mixed initiative) responses.

It should be noted the immediately preceding method above could be extended to a process in which all Turns in the data are scanned, and a mapping inferred across sessions between recognition results and semantic item updating. The advantages of this are that multi-SI responses would be accounted for and the noise of extra Rps which do not contribute to the result would be ignored. Hence a much more robust model of the mapping would be obtained.

Although the present invention has been described with reference to particular embodiments, workers skilled in the art will recognize that changes may be made in form and detail without departing from the spirit and scope of the invention.

What is claimed is:

1. A computer-implemented method of analyzing recognition results between a user and an interactive application having dialog turns, wherein a turn comprises a prompt from the system and a response received from the user, the method comprising:
   receiving and storing information on a computer indicative of dialog turns between the system and at least one user;
   utilizing a recognition analysis module comprising an inference module operable on a computer to associate an inferred value of a response with a turn where the inferred value is based on analyzing the received information without performing transcription of the user responses within the inference module;
   outputting the inferred value; and
   utilizing the inferred value to analyze whether a dialog turn of the interactive application satisfactorily identifies speech and provide an output indicative of whether improvements to the dialog turn of the interactive application are required.

2. The computer-implemented method of claim 1 wherein analyzing the received information comprises analyzing turns where a user confirmation is logged.

3. The computer-implemented method of claim 2 wherein analyzing confirmation turns where the user confirmation is logged comprises identifying application storage locations associated with each confirmation turn.

4. The computer-implemented method of claim 3 wherein identifying application storage locations associated with each confirmation turn comprises identifying application storage locations where the value was at least one of confirmed, denied and corrected.

5. The computer-implemented method of claim 4 wherein analyzing confirmation turns comprises for each identified application storage location, identifying a closest prior turn in which a value of the confirmation turn was obtained.

6. The computer-implemented method of claim 5 wherein analyzing confirmation turns comprises identifying a semantic portion of a recognition result that is mapped to an application storage location having the value of the confirmation turn.

7. The computer-implemented method of claim 5 wherein the inferred value is the value of the confirmation turn and wherein associating the turn with the inferred value includes associating the closest prior turn with the inferred value.

8. The computer-implemented method of claim 4 wherein the turns are related to one or more tasks of the application, and wherein analyzing confirmation turns comprises for each identified application storage location, identifying a closest prior turn in which a value of the confirmation turn was obtained and within a selected task.

9. The computer-implemented method of claim 2 and providing a measure of recognition errors based on analysis of a plurality of turns each having the associated inferred value.

10. The computer-implemented method of claim 1 wherein the application is defined in terms of tasks, and wherein a task involves one or more turns, and wherein analyzing the received information comprises analyzing information related to a task being successfully completed.

11. The computer-implemented method of claim 10 wherein analyzing information related to the task being successfully completed comprises identifying application storage locations associated with the corresponding task having values with confirmed status on task completion.

12. The computer-implemented method of claim 11 wherein analyzing information related to the task being successfully completed comprises for each identified application storage location, identifying a closest prior turn in which a value corresponds to a value received when the task was completed successfully.

13. The computer-implemented method of claim 12 wherein analyzing information related to the task being successfully completed comprises identifying a semantic portion of a recognition result of the closest prior turn that is mapped to an application storage location having the when the task was completed successfully and adding the semantic portion to an array.

14. The computer-implemented method of claim 13 wherein the inferred value is the array and wherein associating the turn with the inferred value includes associating all turns in the task with the inferred value.

15. The computer-implemented method of claim 10 and providing a measure of recognition errors based on analysis of a plurality of turns each having the associated inferred value.

16. The computer-implemented method of claim 1 wherein the application is defined in terms of tasks, and wherein a task involves one or more turns, and wherein analyzing the received information comprises analyzing where a user accepts or denies a value in a confirmation turn in a task that has completed successfully.

17. The computer-implemented method of claim 16 wherein analyzing information comprises identifying an application storage location associated with the confirmation turn having a value with confirmed status on task completion.

18. The computer-implemented method of claim 16 wherein analyzing information comparing the value of the associated with confirmation turn with the value of the storage location when the task was completed successfully.

19. The computer of claim 16 wherein the inferred value comprises acceptance or denial of the value in the confirmation turn, and wherein associating the inferred value comprises associating the correctness of the acceptance or the denial.

20. A computer-implemented method of analyzing recognition results between a user and an interactive application having dialog turns, wherein a turn comprises a prompt from the system and a response received from the user, the method comprising:
   receiving and storing information on a computer indicative of dialog turns between the system and at least one user;
   utilizing a recognition analysis module comprising an inference module operable on a computer to associate an inferred value of a response with a turn where the inferred value is based on analyzing the received information without performing transcription of the user responses within the inference module;
   outputting the inferred value from the inference module;
   utilizing a scoring module operable on a computer to estimate the accuracy of the inferred values;
   outputting the estimated accuracy from the scoring module; and
   utilizing the inferred value and the estimated accuracy to analyze whether the dialog turn of the interactive application satisfactorily identifies speech and provide an output of whether improvements to the dialog turn of the interactive application are required.

* * * * *